US008588620B2

(12) United States Patent
Agranat

(10) Patent No.: US 8,588,620 B2
(45) Date of Patent: Nov. 19, 2013

(54) OPTICAL ROUTING AND TRANSPORT ACCELERATION (ORTA)

(75) Inventor: Aharon Agranat, Mevasseret Zion (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 1101 days.

(21) Appl. No.: 12/090,007

(22) PCT Filed: Aug. 21, 2006

(86) PCT No.: PCT/IL2006/000973
§ 371 (c)(1),
(2), (4) Date: Oct. 8, 2008

(87) PCT Pub. No.: WO2007/043038
PCT Pub. Date: Apr. 19, 2007

(65) Prior Publication Data
US 2009/0252498 A1    Oct. 8, 2009

Related U.S. Application Data

(60) Provisional application No. 60/724,887, filed on Oct. 11, 2005.

(51) Int. Cl.
*G02B 6/14* (2006.01)
(52) U.S. Cl.
USPC .......................................................... 398/142
(58) Field of Classification Search
USPC .......................................................... 398/142
See application file for complete search history.

(56) References Cited

U.S. PATENT DOCUMENTS

| 4,961,621 | A | 10/1990 | Su |
| 5,535,032 | A | 7/1996 | Boettle |
| 5,654,812 | A | 8/1997 | Suzuki |
| 6,256,124 | B1 * | 7/2001 | Hait ................................. 398/9 |
| 6,369,937 | B1 | 4/2002 | Verber et al. |
| 6,876,817 | B2 * | 4/2005 | Wada et al. ..................... 398/79 |
| 7,317,720 | B2 * | 1/2008 | Kamimura et al. ........... 370/366 |
| 7,941,056 | B2 * | 5/2011 | Baker et al. ................... 398/164 |
| 2002/0012492 | A1 | 1/2002 | Takahashi et al. |
| 2002/0149824 | A1 * | 10/2002 | Beaulieu et al. .............. 359/158 |
| 2003/0072550 | A1 | 4/2003 | Sasaura et al. |
| 2005/0047791 | A1 * | 3/2005 | Miyazaki ....................... 398/147 |
| 2005/0168364 | A1 * | 8/2005 | Chen et al. .................... 341/137 |

FOREIGN PATENT DOCUMENTS

JP    60-256124 A    12/1985
WO    2004/070978 A2    8/2004

OTHER PUBLICATIONS

English translation of Masumoto (JP 60-256124), Jul. 2011.*
U.S. Appl. No. 60/443,174, filed Jan. 29, 2003.
International Search Report mailed Dec. 15, 2006.
L. Soldano et al., "Optical Multi-Mode Interference Devices Based on Self-Imaging: Principles and Applications", Journal of Lightwave Technology, vol. 13, No. 4, pp. 615-627, Apr. 1995.
Y. Silberberg et al., "Digital optical switch", Appl. Phys. Lett. 51(16), 1230-1232, Oct. 19, 1987.

(Continued)

*Primary Examiner* — Shi K Li
(74) *Attorney, Agent, or Firm* — Browdy and Neimark, PLLC

(57) ABSTRACT

Conversions between digital, parallel-electronic and digital, serial-optic words are presented, specifically for interconnection networks with optical communication links.

35 Claims, 25 Drawing Sheets

(56) References Cited

OTHER PUBLICATIONS

F. Devaux et al., "Electroabsorption modulators for high-bit-rate optical communications: a comparison of strained InGaAs/InAlAs and InGaAsP/InGaAsP MQW", Topical Review, Semicond. Sci. Technol. 10(1995) 887-901.

Michael Bass, Editor in Chief, "Handbook of Optics, vol. 4: Fiber Optics and Nonlinear Optics, Chapter 12: Optical Time Division Multiplexed Communication Networks", pp. 32-33: Electrooptic modulators, McGraw Hill 2001, ISBN 0-07-136456-0.

Govind P. Agrawal, Fiber-Optic Communication Systems, Third Edition, "Chapter 4: Optical Receivers", a John Wiley & Sons, Inc. Publication (2002), ISBN 0-471-22114-7.

Norio Kashima, "Passive Optical Components for Optical Fiber Transmission", Chapter 10: Optical Coupler and Branch, Section 10.1 Directional Coupler, pp. 225-244, 1995 Artech House Inc.

A. Gumennik et al., "Thermal stability of a slab waveguide implemented by a particles implantation in potassium lithium tantalate niobate", Applied Physics Letters 87, 251917-1 to 251917-3, 2005.

A. Liu et al., "A high-speed silicon optical modulator based on a metal-oxide-semiconductor capacitor", Nature, vol. 427, pp. 615-618, Feb. 12, 2004.

L. A. Coldren et al., University of California, Santa Barbara, "Diode Lasers and Photonic Integrated Circuits", a John Wiley & Sons InterScience Publication, 1995. Content pages only.

\* cited by examiner

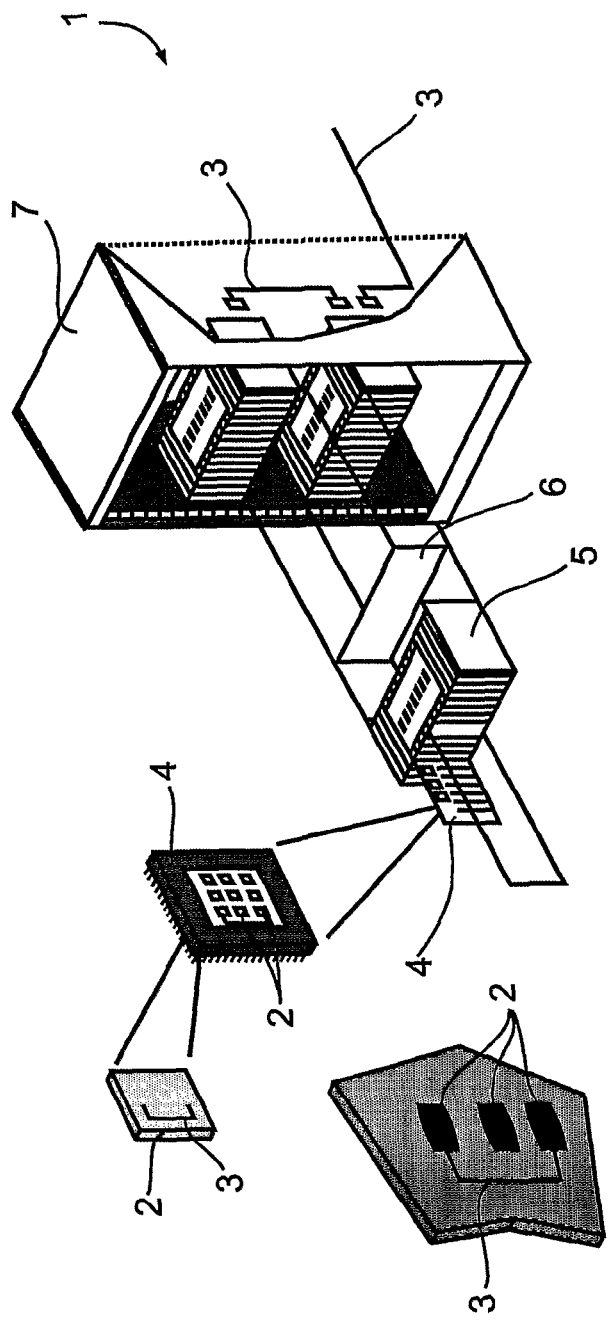
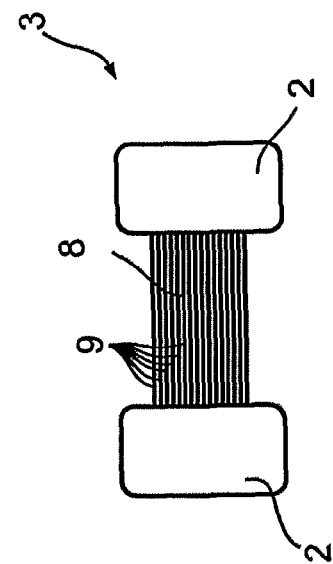
Fig. 1a
Fig. 1b

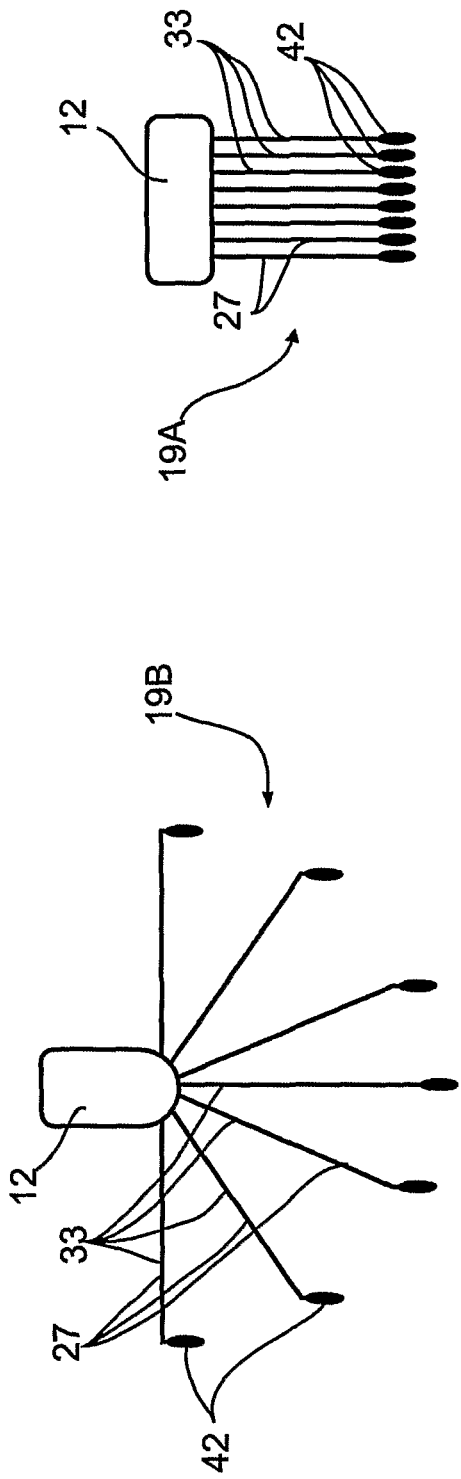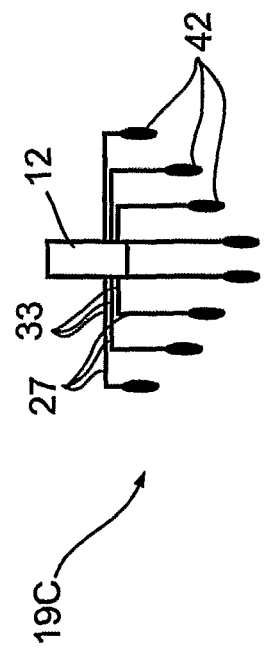
Fig. 2b
Fig. 2c
Fig. 2d

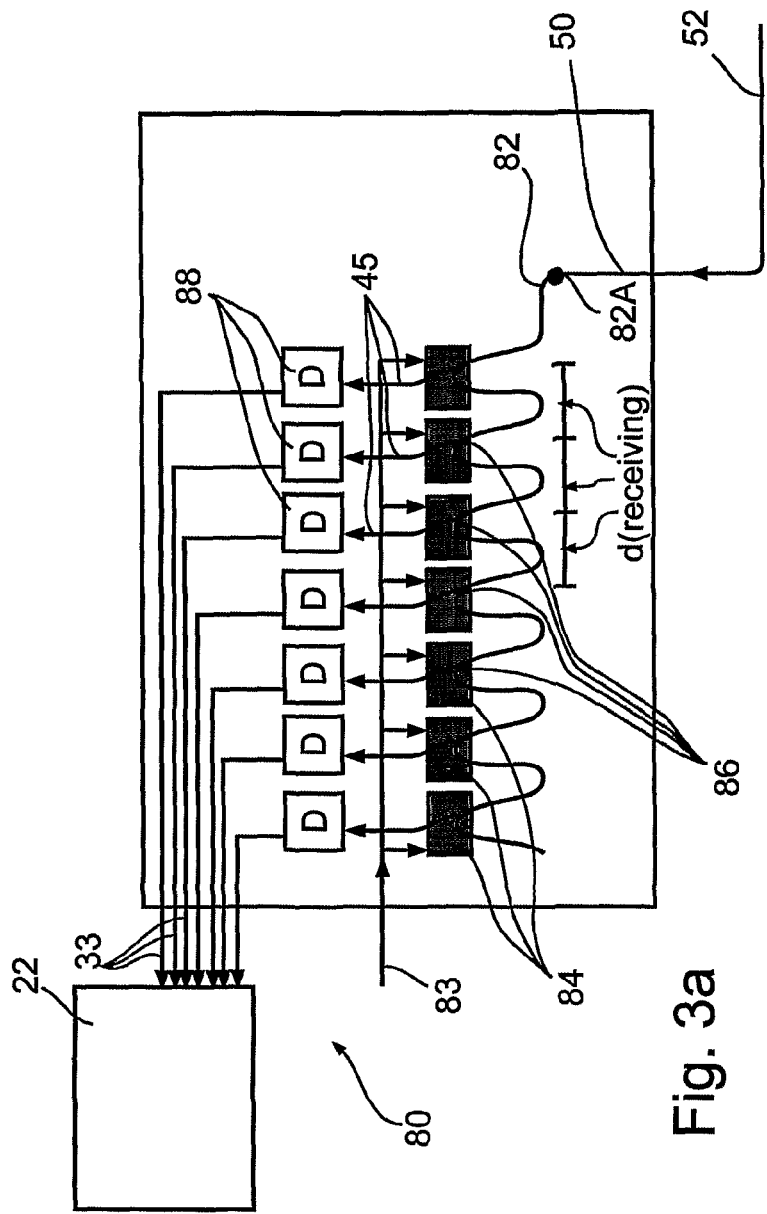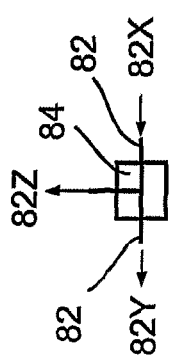
Fig. 3a
Fig. 3b

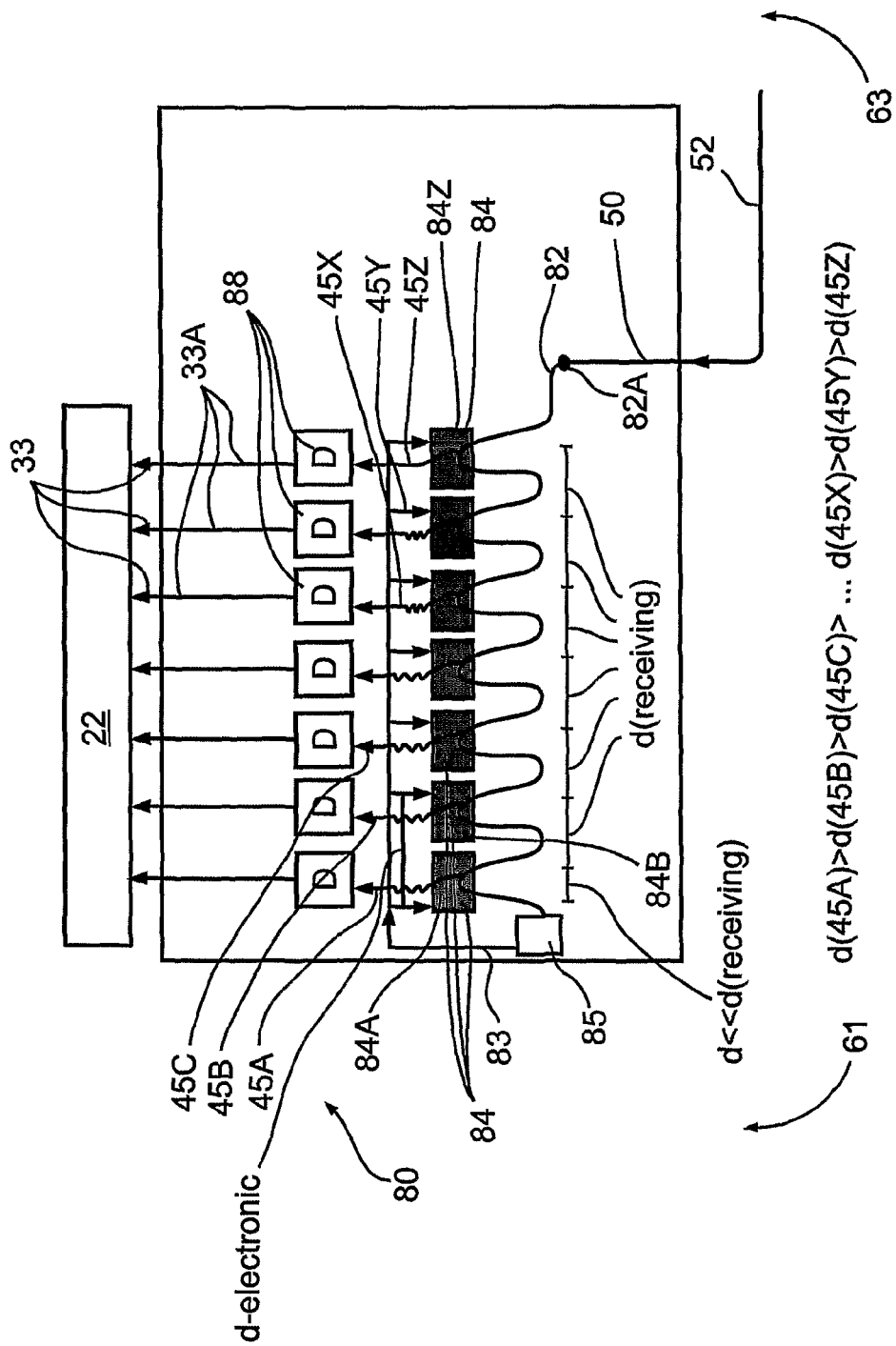

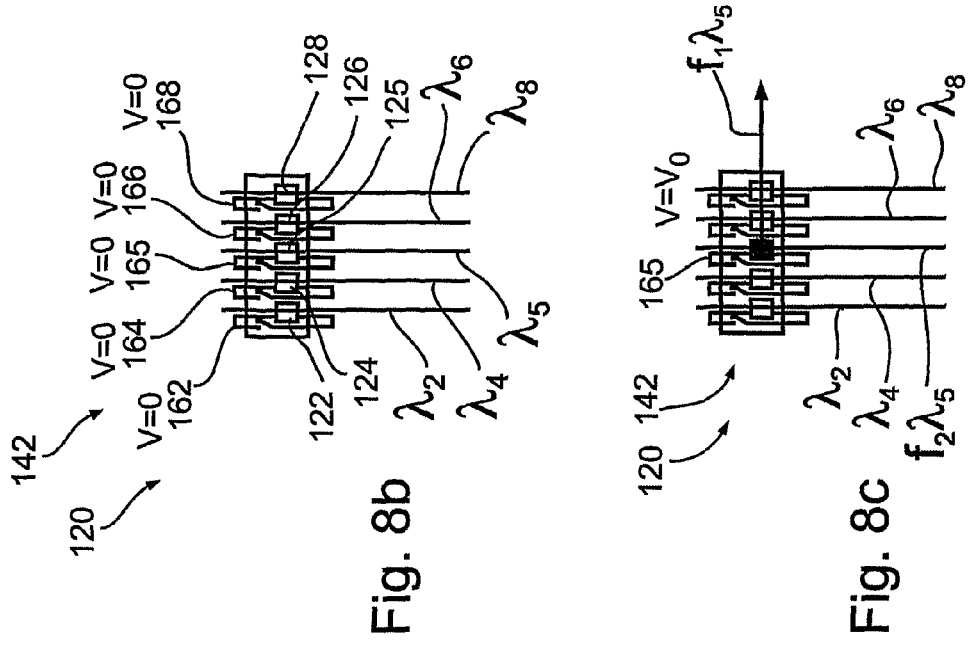
Fig. 8b
Fig. 8c
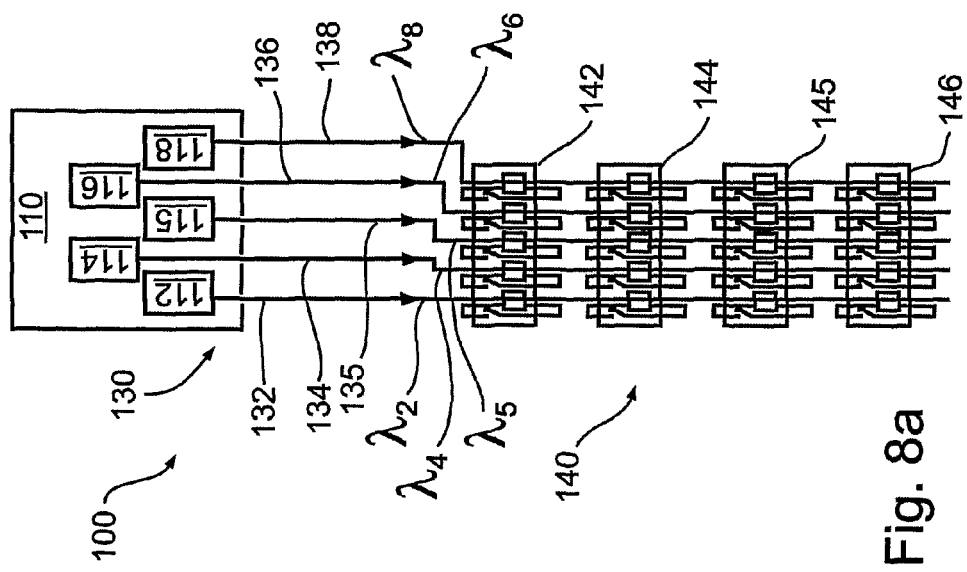
Fig. 8a

OPTICAL ROUTING AND TRANSPORT ACCELERATION (ORTA)

FIELD OF THE INVENTION

The present invention relates to improved architectures and methods for conversion between digital, parallel-electronic words and digital, serial-optic words.

BACKGROUND OF THE INVENTION

The construction of interconnection networks is an ongoing challenge, as it must keep in pace with the ever-going increase in volume and speed of the basic microelectronic components. Employing optical communication links in interconnection networks provides increased capacity, but to date, conversion between the electronic and the optical systems has several problems: it is expensive; it involves high energy consumption; and it introduces latency to the link, so as to slow down the communication rate.

As seen in FIG. 1a, the basic components of a digital electronic system 1 are the silicon-based integrated circuits 2, or chips 2, such as digital processors, memory chips, and various auxiliary circuits, including controllers, I/O and multiplexing chips, digital to analog converters, and the like. They also include a large number of special purpose integrated circuits for specific applications. These are mounted onto printed circuit boards 4 (PCB 4) and are interconnected by many layers of electrical conduits, forming the interconnection networks 3. In complex systems, several boards 4 are mounted in racks 5, which are further mounted in cabinets 7. The interconnection network between the boards 4 in the rack 5 and the cabinet 7 is implemented by means of a backplane 6, the core of which is an extremely complex PCB.

Order of magnitude lengths of the interconnection networks 3 within the chip 2 may be about 1 mm. Between chips 2, they may be about 1 cm, within the board 4, they may be about 10 cm, within the cabinet 7, they may be about 1 m, between cabinets, they may be about 10 meters, and between systems 1, they may be about 100 m.

The electronic interconnection network 3 is illustrated in FIG. 1b as a data bus 8. Early buses were literally arrays of parallel connectors 9, configured for transferring the synchronized parallel electronic bits of the digital electronic word. But the term "bus" may also apply to any physical arrangement that provides the same logical functionality as a parallel electrical bus.

The digital processor is characterized by a clock cycle or its inverse, the operating frequency, which define the time for executing a single step in a program. Additionally, the digital processor is characterized by a digital electronic word of a specific word size—a predetermined number of parallel electronic bits, synchronized with the clock cycle.

The highest data transfer rate between a processor and another component of the system 1 is realized when each clock cycle of the processor produces a digital electronic word for transfer. The required transfer rate along each of the parallel conduits of the bus is then equal to the operating frequency of the processor. A slower rate may occur when several steps, requiring several clock cycles, are executed prior to the data transfer. For example, depending on the processor, multiplication may require 3 steps, hence, three clock cycles. Nonetheless, the architecture should be designed to meet the highest data transfer rate.

Yet there are problems with a very high data transfer rate, for example, of the order of 1 GHz or higher along the parallel conduits:

1. for acceptable signal to noise ratio along the conduits, the product, distance X data-rate, has to be maintained comparatively low, and in consequence, transfer of data at very high rates is limited to short distances;
2. adjacent parallel conduits manifest cross talk between them, due to electromagnetic interference, which is especially problematic in massively parallel interconnection networks, and which increases with increasing data transfer rate;
3. massively parallel electrical interconnection networks are associated with high heat generation, which also increases with increasing data transfer rate; and
4. high data transfer rate are generally associated with complex PCB, and as the complexity of the PCB grows, the fabrication-process yield decreases, and fabrication becomes expensive.

With the growing demand to process larger volumes of digital data at ever increasing speeds and the exponential growth in performance of the basic microelectronic components, the interconnection network, implemented as a multi-layered complex of parallel electrical conduits, becomes a major bottle neck, slowing the technological progress.

A solution may be optical communication links, which have been found effective in telecommunication, and which may be similarly effective for interconnection networks. In telecommunication, light pulses, propagating in glass fibers, has been proven the most effective method for fast transport of large volumes of digital data over long distances.

While the electronic data is represented in the form of digital, parallel-electronic word, the optical data is organized as a serial string of photonic bits, termed herein, digital, serial-optic word. Thus, conversion between the electronic and optic words requires two processes:
1. conversion between parallel and serial signals, by complex multiplexing or de-multiplexing; and
2. conversion between the electronic and the optic representations of the signals, using fast electronic devices and opto-electronic modulators.

These processes are illustrated in FIG. 1c, which describes a standard interconnection network 10, as known, employing an optical fiber communication link 17, between a transmitting electronic processing element 12 (EPU 12) and a receiving electronic processing element 22. The standard interconnection network 10, which is termed in the art, "point-to-point electronic to optical to electronic (EOE) link," operates as follows:
1. At a transmitting end 11, a digital, parallel-electronic word 13, produced by a transmitting electronic processing element 12, is multiplexed into a serial string of electrical pulses 15, by a multiplexer 14.
2. The serial string of electrical pulses 15 is then converted into a serial string of photonic bits 20, using a standard, for example, Emitter-Coupled-Logic (ECL) or another standard, as known. The conversion may be performed by means of an optical transmitter 16, at the core of which is a constant-power laser light source 16A and a fast optical shutter 16B, such as an electrooptic modulator 16B or an electroabsorption modulator 16B.
3. The serial string of photonic bits 20 is transmitted via the optical fiber 17 toward the receiving end 21.
4. At the receiving end 21, an optoelectronic receiver 26 converts optical analog signals, propagating in the optical fiber 17, into electronic digital signals, again using a standard such as ECL or another standard, as known. The conversion is a two step process, employing two apparatus, as follows:
   a. a first apparatus, being an optical detector:
      i. for converting the optical analog signal to an electronic analog signal; and ii. for recovering the clock frequency and phase of the digital signal represented by the electronic analog signal; and b. a second apparatus, which is essentially a "comparator," and which has a pre-set threshold level, defined by the standard, for converting electronic analog signals below the pre-set threshold level to bits of 0, and electronic analog signals above the pre-set threshold level to bits of 1, to form the electronic digital signal.

Thus the optoelectronic receiver 26 converts the serial string of photonic bits 20, to a corresponding serial string of electronic signals 25.

5. A de-multiplexing circuit 24 converts the serial string of electronic signals 25 to an electronic vector of parallel bits 23, which is essentially the digital, parallel-electronic word 13, at the input ports of the receiving electronic processing element 22.

The conversion from the parallel signal 13, transferred along a bus of parallel conduits, to the serial signal 15, transferred along a single conduit, increases the required data transfer rate by the number of bits per channel, so that the highest data transfer rate that may be realized is:

$$B = N \times f \text{(bits/sec)} \quad [1]$$

where,

N is the number of bits in the digital electronic word 13, and f is the operating frequency.

For example, given a processor configured for an operating frequency of 1 GHz and a word size of 64 bits, the highest data transfer rate from the processor will be 64 Gb/sec, compared with 1 GHz along each of the parallel conduits of the bus. But the single fiber 17 is capable of meeting this rate and is further capable of meeting significant future expansions. In general, a transmission line is characterized by the product B·L, where B is the bit transfer rate, and L is the length of the transmission line. For example: for a polarization-maintaining, dispersion-shifted, single-mode, optical fiber operating at $\lambda=1550$ nm, $B \cdot L > 2 \cdot 10^{12}$ (bit/seconds)·km per (wavelength) channel, so in principle, it is possible to transfer 100 Gb/sec to a distance greater than 20 kilometers, using such a fiber. This is significantly greater than the bit transfer rate of 64 Gb/sec of the electronic circuit. Moreover, when employing wavelength division multiplexing (WDM), with a single fiber carrying a number of parallel channels of different wavelengths, a transfer rate of approximately 1 Tb/sec per fiber may be achieved. Thus, with WDM, a many fold increase in the bit transfer rate of an electronic system can still be met by a state of the art optical communication link of single fiber.

However, the procedure described in FIG. 1c imposes severe constraints on the efficiency of the communication in massively parallel networks, as it requires conversion of the data from electronic to optical at the output, and from optical to electronic at the input of each node. Additionally, it requires expensive and fast electronic circuitry, and in particular, very fast optical shutters. Furthermore, it involves high energy consumption and introduces substantial latency to the link.

SUMMARY OF THE INVENTION

Architectures and methods are provided for converting between digital, parallel-electronic words and digital, serial-optic words, specifically for interconnection networks between chips, boards, cabinets, and the like, which employ optical communication links. A method for converting from the parallel-electronic to the serial-optic words includes: providing a primary laser pulse; dividing it to parallel secondary laser pulses, each of substantially the same time profile as the primary laser pulse; modulating the parallel secondary laser pulses in accordance with the digital, parallel-electronic word, to produce parallel photonic bits; and coupling the parallel photonic bits to a waveguide, at transmitting coupling points, arranged at predetermined transmitting optical path lengths along the waveguide, the transmitting optical path lengths between the transmitting coupling points producing time delays between the photonic bits, thus producing a serial string of photonic bits, representing the digital, serial-optic word. The reverse process comprises: positioning a vector of N electrically activated couplers, formed as N 1×2 optical switches, at predetermined receiving coupling points along a receiving main waveguide, spaced apart at receiving optical path lengths which correspond to time delays between the photonic bits of the serial string of N photonic bits, and defining a distal electrically-activated coupler, with respect to a receiving-main-waveguide input; aligning a vector of N optoelectronic receivers with the vector of N electrically activated couplers, so as to form a one-to-one correspondence between the optoelectronic receivers and the electrically-activated couplers; allowing the serial string of N photonic bits to pass along the receiving main waveguide, until the lead photonic bit reaches the distal electrically-activated coupler, so that the other pulses are each at an input channel of a respective one of the N electrically-activated couplers; then activating the N electrically-activated couplers, to convert the serial string of N photonic bits to N parallel photonic bits; and at the optoelectronic receivers, converting the N parallel photonic bits to N parallel electronic bits, to form the digital, parallel-electronic word.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a-1b are schematic representations of electronic systems, as known;

FIGS. 2a-2e are representation of transmitting architectures, in accordance with embodiments of the present invention;

FIGS. 3a-3c schematically illustrate receiving architectures, in accordance with embodiments of the present invention;

FIGS. 6a-6d further illustrate transmission and receiving architectures, in accordance with embodiments of the present invention;

FIGS. 8a-8c are representation of a laser power grid, for providing laser beams of different wavelengths to communication architectures.

DESCRIPTION OF THE PREFERRED EMBODIMENTS

Figure 1C:
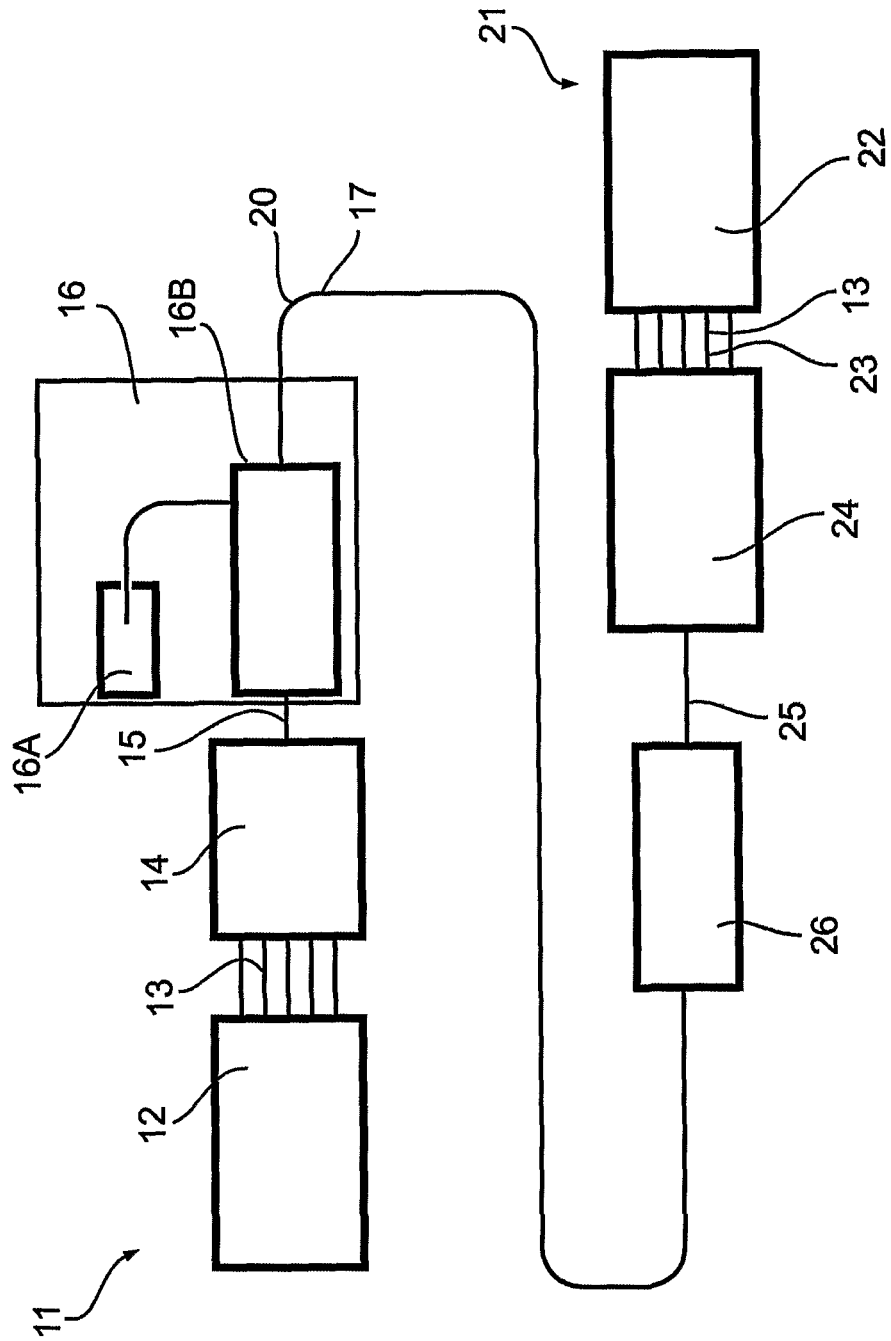
FIG. 1c is a schematic representation of architecture linking electronic digital processing elements by optical fiber communication, as known.

The present invention relates to architectures and methods for converting between digital, parallel-electronic words and digital, serial-optic words, specifically for interconnection networks between chips, boards, cabinets, and the like, which employ optical communication links. A method for converting from the parallel-electronic to the serial-optic words includes: providing a primary laser pulse; dividing it to parallel secondary laser pulses, each of substantially the same time profile as the primary laser pulse; modulating the parallel secondary laser pulses in accordance with the digital, parallel-electronic word, to produce parallel photonic bits; and coupling the parallel photonic bits to a waveguide, at transmitting coupling points, arranged at predetermined transmitting optical path lengths along the waveguide, the transmitting optical path lengths between the transmitting coupling points producing time delays between the photonic bits, thus producing a serial string of photonic bits, representing the digital, serial-optic word. The reverse process comprises: positioning a vector of N electrically activated couplers, formed as N 1×2 optical switches, at predetermined receiving coupling points along a receiving main waveguide, spaced apart at receiving optical path lengths which correspond to time delays between the photonic bits of the serial string of N photonic bits, and defining a distal electrically-activated coupler, with respect to a receiving-main-waveguide input; aligning a vector of N optoelectronic receivers with the vector of N electrically activated couplers, so as to form a one-to-one correspondence between the optoelectronic receivers and the electrically-activated couplers; allowing the serial string of N photonic bits to pass along the receiving main waveguide, until the lead photonic bit reaches the distal electrically-activated coupler, so that the other pulses are each at an input channel of a respective one of the N electrically-activated couplers; then activating the N electrically-activated couplers, to convert the serial string of N photonic bits to N parallel photonic bits; and at the optoelectronic receivers, converting the N parallel photonic bits to N parallel electronic bits, to form the digital, parallel-electronic word.

The principles and operation of the various embodiments according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 2a-2e schematically represent a transmitting architecture 30 for converting a digital, parallel-electronic word 33 to a digital, serial-optic word 50, in accordance with embodiments of the present invention.

Figure 2A:
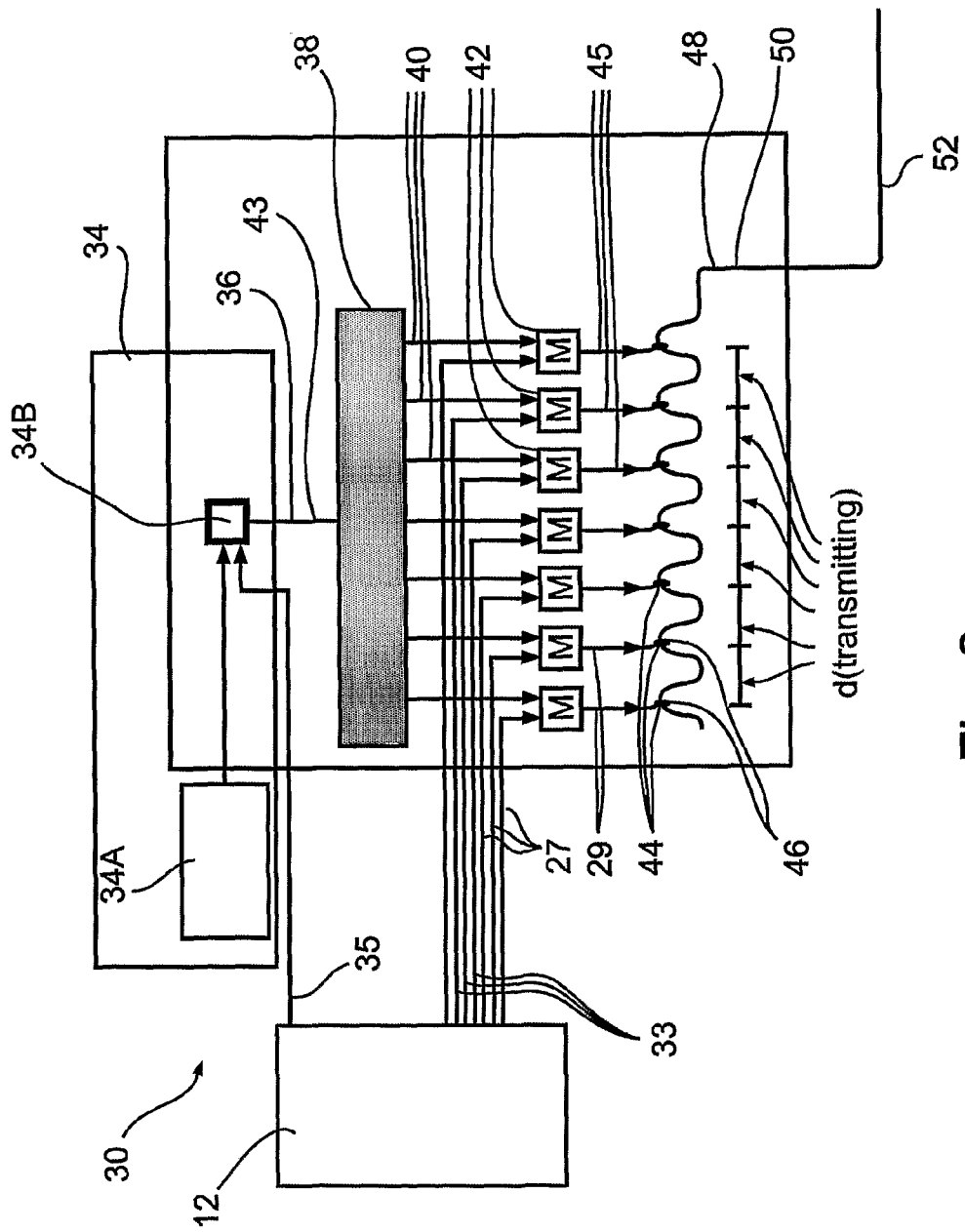

As seen in FIG. 2a, the transmitting architecture 30 includes the transmitting source 12 and electrical conduits 27, for transmitting the digital, parallel-electronic word 33, which is represented by N parallel electronic bits. Each electronic bit may represent either "1" or "0". Additionally, the transmitting source 12 produces a trigger 35, synchronized with each of the digital, parallel-electronic word 33.

The transmitting source 12 may be a digital electronic processing unit (EPU), referred to herein as a digital electronic network node, for example, an integrated circuit (a chip), a printed circuit board (PCB), a rack, or a cabinet.

The transmitting architecture 30 further includes a laser pulse source 34, which provides a primary laser pulse 36, propagating in a waveguide 43, upon receiving the trigger 35, and a laser pulse divider 38, which receives the laser pulse 36 from the waveguide 43 and divides it into N parallel secondary laser pulses 40, each of 1/N of the energy of the primary laser pulse 36 and a substantially identical time profile as that of the primary laser pulse.

The laser pulse source 34 may include a laser 34A, for providing a laser beam, and a triggering fast optical shutter 34B, for example, constructed as an electrooptic modulator 34B or an electroabsorption modulator 34B, for producing the primary laser pulse 36 upon receiving the trigger 35.

Alternatively, the laser pulse source 34 may be a laser power grid, described hereinbelow, in conjunction with FIGS. 7a-8c, for providing laser pulses in a plurality of wavelengths, for wavelength division multiplexing (WDM) and for wavelength addressing. Alternatively the laser pulse source 34 may be a tunable laser.

The laser pulse divider 38 may be, for example, a multimode interferometer, as taught by Soldano et al., "Optical Multi-Mode Interference Devices Based on Self-Imaging: Principles and Applications", J. of Lightwave Technology 13 (4): 615-627 (April 1995).

Additionally, the transmitting architecture 30 includes a vector of N fast optical shutters 42, for example, constructed as electrooptic modulators 42 or electro-absorption modulators 42, each in optical communication with one of the N parallel secondary laser pulses 40 and in signal communication with one of the bits of the digital, parallel-electronic word 33. The fast optical shutters 42 allow passage of the secondary laser pulses 40, to a vector of waveguides 29, for any "1" bit and preventing passage for any "0" bit of the digital, parallel-electronic word, thus producing a digital, parallel-optic word 45 represented as N parallel photonic bits.

Furthermore, the transmitting architecture 30 includes a vector of N directional couplers 44, positioned at predetermined transmitting coupling points 46 along a transmitting main waveguide 48 and aligned with the vector of N fast optical shutters 42, so as to form a one-to-one correspondence between the fast optical shutters 42 and the directional couplers 44, wherein optical path lengths d(transmitting) between the transmitting coupling points 46 along the transmitting main waveguide 48 produce time delays between the individual pulses of the N parallel photonic bits 45, thus producing the serial string of the N photonic bits, representing the digital, serial-optic word 50, which may then be coupled to a communicating waveguide 52, for transmission.

The time delays between successive pulses of the digital, serial-optic word 50 are defined herein as serial-optic-word time delays.

The optical path lengths between adjacent transmitting coupling points 46 along the transmitting main waveguide 48 are substantially equal and are determined by the following equation:

$$d(\text{transmitting}) = \tau \times V(t)/N, \quad [2]$$

wherein:

d(transmitting) is the substantially equal path lengths along which the pulses propagate between adjacent transmitting coupling points;

$\tau$ is a time segment between consecutive words;

N is the number of bits in the digital, parallel-electronic word; and

V(t) is the velocity of propagation of the photonic bits in the transmitting main waveguide.

Preferably, as illustrated in FIG. 2b, 2c, or 2d, by any one of architectures 19A, 19B, or 19C, the electronic pulses of the digital, parallel-electronic word 33 travel equal distances in the electrical conduits 27, between the transmitting electronic processing element 12 and the fast optical shutters 42, for activating the fast optical shutters 42 substantially simultaneously.

It will be appreciated that another architecture of the electrical conduits 27, for providing equal distances between the transmitting electronic processing element 12 and the fast optical shutters 42 may be used, as known.

In accordance with another embodiment, the electronic pulses of the digital, parallel-electronic word 33 may travel varying distances in the electrical conduits 27 activating the fast optical shutters 42 at different times. A situation of increasing distances of the electrical conduits 27 is illustrated in FIG. 2a. This may be compensated by decreasing distances traveled by the photonic pulses making up the digital, parallel-optic word 45 in the waveguides 29, such that the photonic pulses making up the digital, parallel-optic word 45 are coupled substantially simultaneously to the transmitting main waveguide 48, at the directional couplers 44.

In accordance with yet another embodiment, compensation may take place at the receiving end, as illustrated hereinbelow, in conjunction with FIGS. 6a-6d.

Preferably, the transmitting main waveguide 48 is a single-mode waveguide.

Preferably, the transmitting main waveguide 48 is substantially insensitive to the operating wavelength.

In accordance with some embodiments, the most significant bit of the digital, parallel-electronic word 33 is the lead photonic bit in digital, serial-optic word 50.

In accordance with other embodiments, the most significant bit of the digital, parallel-electronic word 33 is the trailing photonic bit in digital, serial-optic word 50. It will be appreciated that other arrangements are also possible.

Figure 2E:
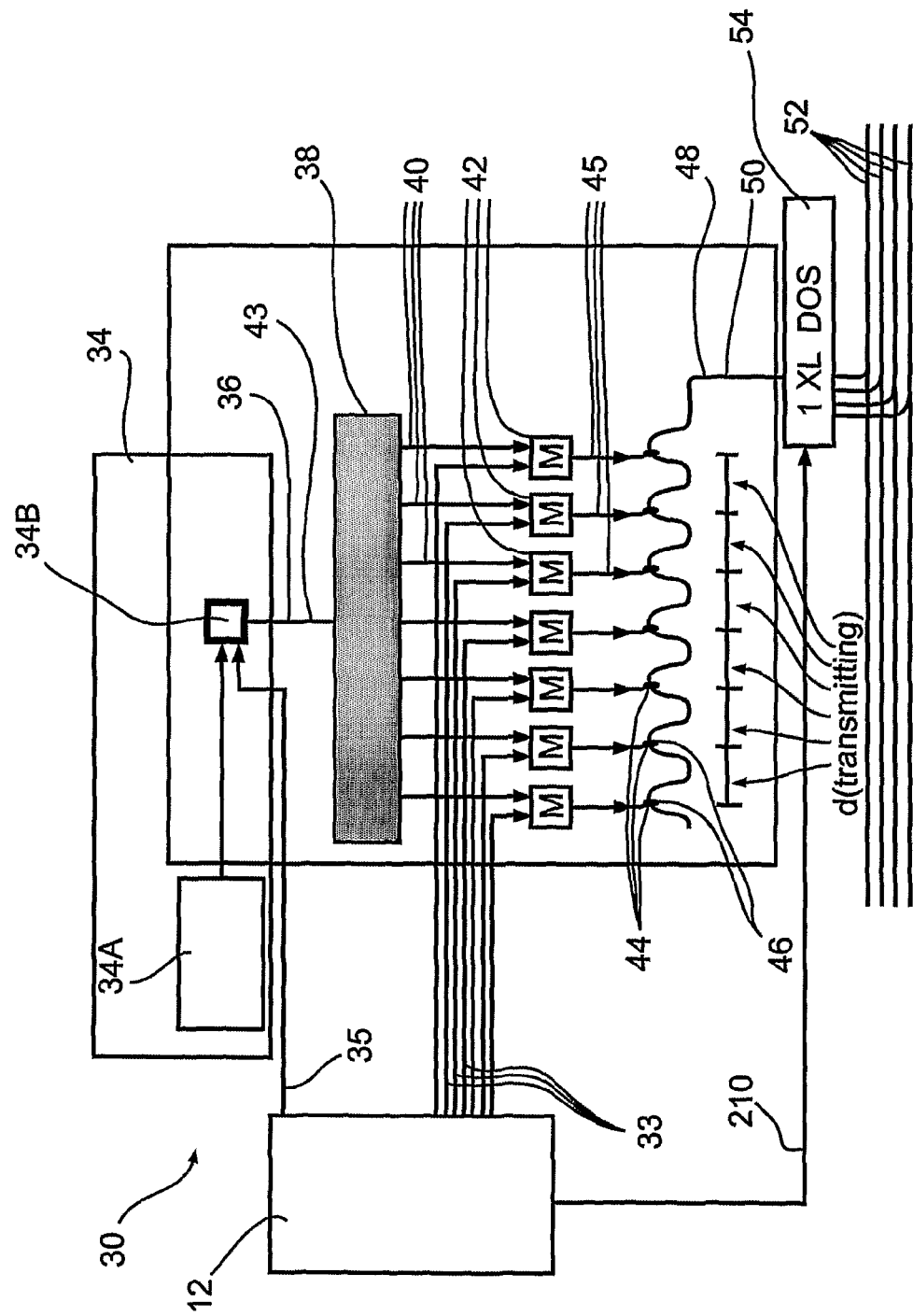

Referring further to the drawings, FIG. 2e is a schematic representation of the transmitting architecture 30, in accordance with another embodiment of the present invention, wherein a plurality of communicating waveguides 52 is employed.

Accordingly, the plurality of communicating waveguides 52 is coupled to the transmitting main waveguide 48 via a routing optical switch 54. Preferably, the transmitting source 12 provides an electronic waveguide select signal 210, to the routing optical switch 54, for routing the digital, serial-optic word 50 to a specific, pre-selected one of the communicating waveguides 52.

The routing optical switch 54 may be, a digital optical switch (DOS), for example an array 1×L of Digital optical switches, as taught by Silberberg, et al., "Digital optical switch", Appl. Phys. Lett. 51 (16), 1987.

Figure 2F:
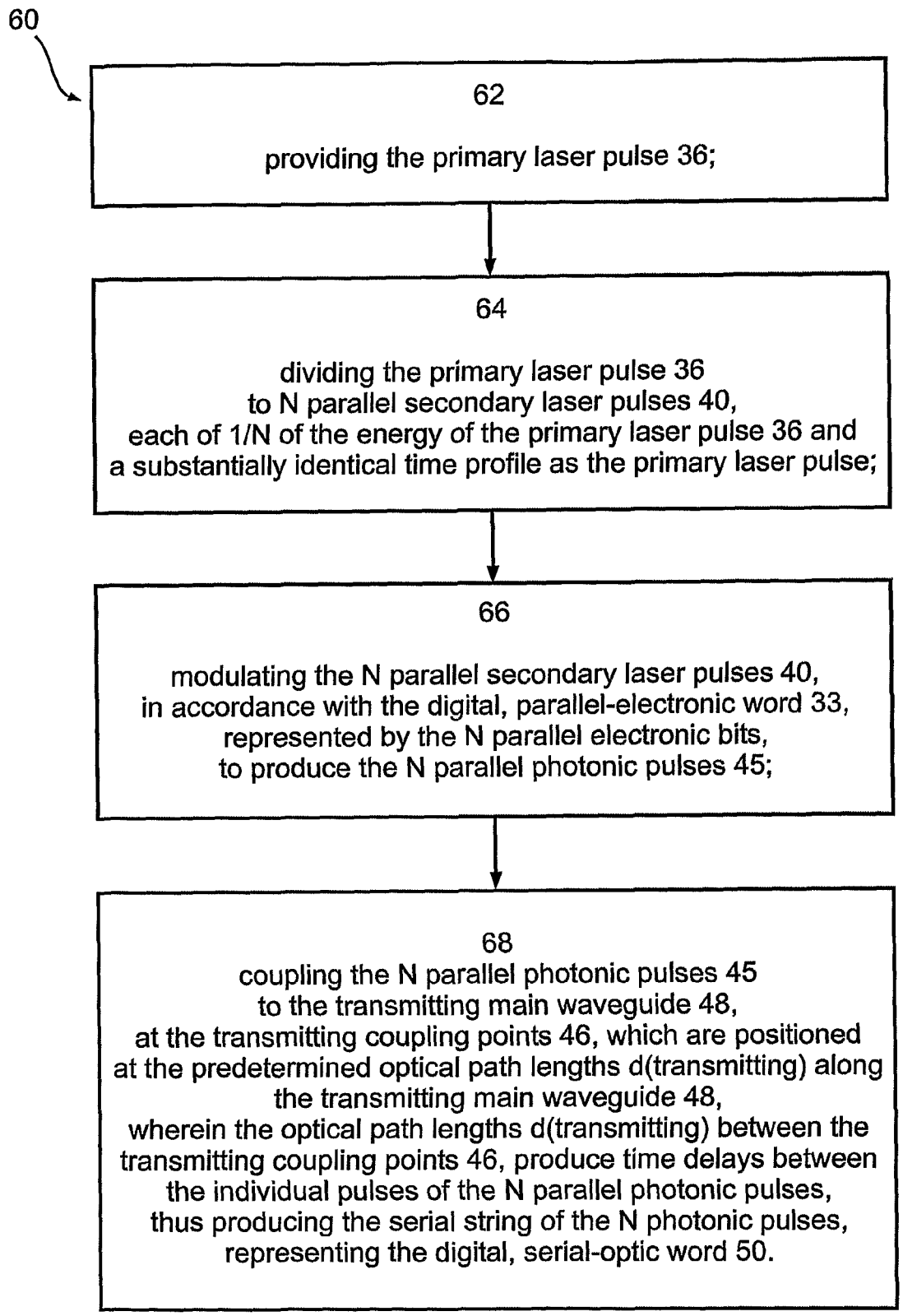
FIG. 2f is a flowchart of a transmitting process, in accordance with embodiments of the present invention.

Referring further to the drawings, FIG. 2f is a flowchart of a method 60 for converting the digital, parallel-electronic word 33 to the digital, serial-optic word 50, according to embodiments of the present invention. The method 60 includes:

in a box 62: providing the primary laser pulse 36;

in a box 64: dividing the primary laser pulse 36 to N parallel secondary laser pulses 40, each of 1/N of the energy of the primary laser pulse 36 and a substantially identical time profile as the primary laser pulse 36;

in a box 66: modulating the N parallel secondary laser pulses 40, in accordance with the digital, parallel-electronic word 33, represented by the N parallel electronic bits, to produce N parallel photonic bits 45; and in a box 68: coupling the N parallel photonic bits 45 to a transmitting main waveguide 48, at the transmitting coupling points 46, which are positioned at predetermined locations spaced at d(transmitting) along the transmitting main waveguide 48, wherein the path lengths d(transmitting) between the transmitting coupling points 46 produce time delays between the individual pulses of the N parallel photonic bits, thus producing the serial string of the N photonic bits, representing the digital, serial-optic word 50.

Referring further to the drawings, FIGS. 3a and 3b schematically illustrate a receiving architecture 80, for converting a digital, serial-optic word 50 to a digital, parallel-electronic word 33, in accordance with some embodiments of the present invention.

As seen in FIG. 3a, the receiving architecture 80 includes a receiving main waveguide 82, which defines a receiving-main-waveguide input point 82A. The receiving main waveguide 82 is in communication with at least one of the communicating waveguides 52, via which, the digital, serial-optic word 50 arrives at the receiving architecture 80.

Additionally, the receiving architecture 80 includes a vector of N electrically activated couplers 84, for example, formed as 1×2 optical switches 84, which are positioned at predetermined coupling points along the receiving main waveguide 82.

As seen in FIG. 3b, Each of the electrically-activated couplers 84 or 1×2 optical switches 84 has an input 82X along the receiving main waveguide 82, a first output 82Y, which continues along the receiving main waveguide 82, and a second output 82Z, which is activated when the electrically-activated coupler 84 is on, and which leads to an optoelectronic receivers 88.

Returning to FIG. 3a, the receiving architecture 80 includes a vector of N optoelectronic receivers 88, aligned with the vector of N electrically activated couplers 84, at receiving coupling points 86, so as to form a one-to-one correspondence between them, wherein the second output 82Z of each of the electrically-activated couplers 84 is directed at one of the optoelectronic receivers 88.

The vector of N electrically activated couplers 84 is synchronized and configured for converting the digital, serial-optic word 50 to a digital, parallel-optic word 45. The receiving coupling points 86 of the electrically-activated couplers 84 are preferably spaced at substantially equal path lengths from each other, d(receiving), which are determined by the following equation:

$$d(\text{receiving}) = \tau \times V(r)/N, \quad [3]$$

wherein:

d(receiving) is the substantially equal path lengths along which the pulses propagate between adjacent receiving coupling points 86;

τ is a time segment between consecutive words;

N is the number of bits in the digital, parallel-electronic word; and

V(r) is the velocity of propagation of the photonic bits in the receiving main waveguide 82.

In general, the optical path length is defined as:

$$n \times L, \quad [4]$$

wherein:

n is the index of refraction of a waveguide 82; and

L is the length of the waveguide.

It will be appreciated that for any given digital, serial-optic word 50, the optical path lengths between adjacent transmitting and receiving coupling points must be substantially equal:

$$n(\text{transmitting waveguide}) \cdot d(\text{transmitting}) = n(\text{receiving waveguide}) \cdot d(\text{receiving}). \quad [5]$$

However, the physical lengths of propagation d(transmitting) and d(receiving) may be different, as each may be formed with a different index of refraction.

The vector of N optoelectronic receivers 88 is synchronized and configured for converting the digital, parallel-optic word 45 to the digital, parallel-electronic word 33 of the N parallel electronic bits.

The digital, parallel-electronic word 33 may then be electronically directed to a receiving electronic processing unit 22—another digital electronic processing unit (EPU) or digital electronic network node, for example, an integrated circuit, a printed circuit board (PCB), a rack, or a cabinet.

Preferably, the vector of N electrically activated couplers 84 remains in an off position, allowing the serial string of N photonic bits 50 to propagate along the receiving main waveguide 82, until the lead photonic bit, which preferably represents the most significant bit, reaches a distal optical switch 84A, with respect to the receiving-main-waveguide input 82A.

Upon an electronic triggering signal 83, which is described hereinbelow, in conjunction with FIGS. 5a-5f, the N electrically-activated couplers 84 are substantially simultaneously activated, just as all the pulses of the series of pulses 50 are incident in parallel on their respective electrically-activated couplers 84. In this manner, the digital, serial-optic word 50, formed as the serial string of photonic bits 50, is converted to the N parallel photonic bits of the digital, parallel-optic word 45.

Figure 3C:
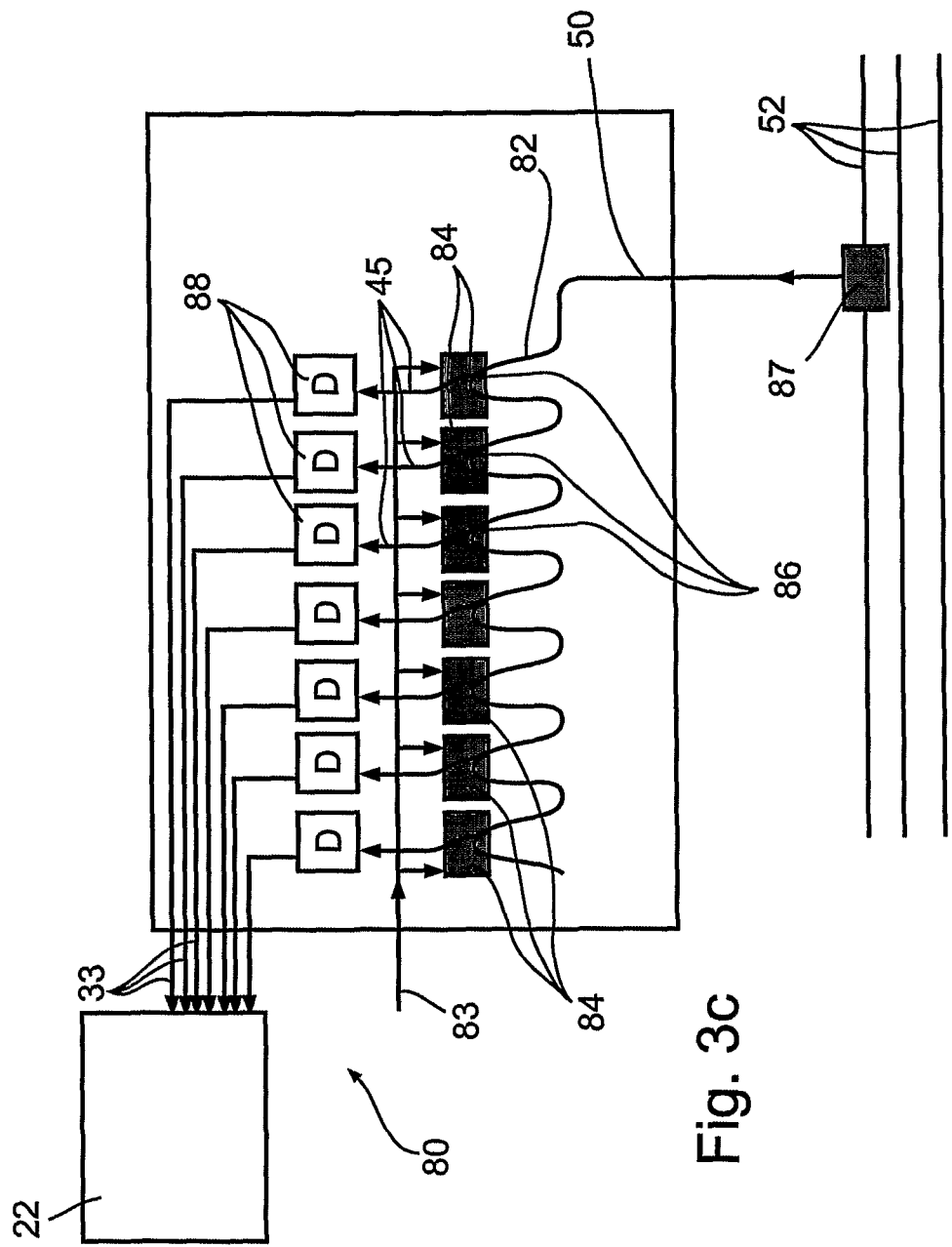

Referring further to the drawings, FIG. 3c is a schematic representation of the receiving architecture 80, in accordance with another embodiment of the present invention, wherein a plurality of communicating fibers 52 may be employed, in passive communication with the receiving main waveguide 82, so that the receiving main waveguide 82 receives the digital, serial-optic word 50, for example, by employing wavelength addressing.

Preferably, WDM and possibly also wavelength addressing is employed in the plurality of the communicating fibers 52.

Thus, a channel drop WDM filter 87, at the receiving end 21, drops a digital, serial-optic word of a predetermined wavelength, of the wavelength address associated with the receiver, into the receiving main waveguide 82.

Preferably the receiving main waveguide 82 is a single-mode waveguide.

Preferably the receiving main waveguide 82 is substantially insensitive to the operating wavelength.

Figure 3D:
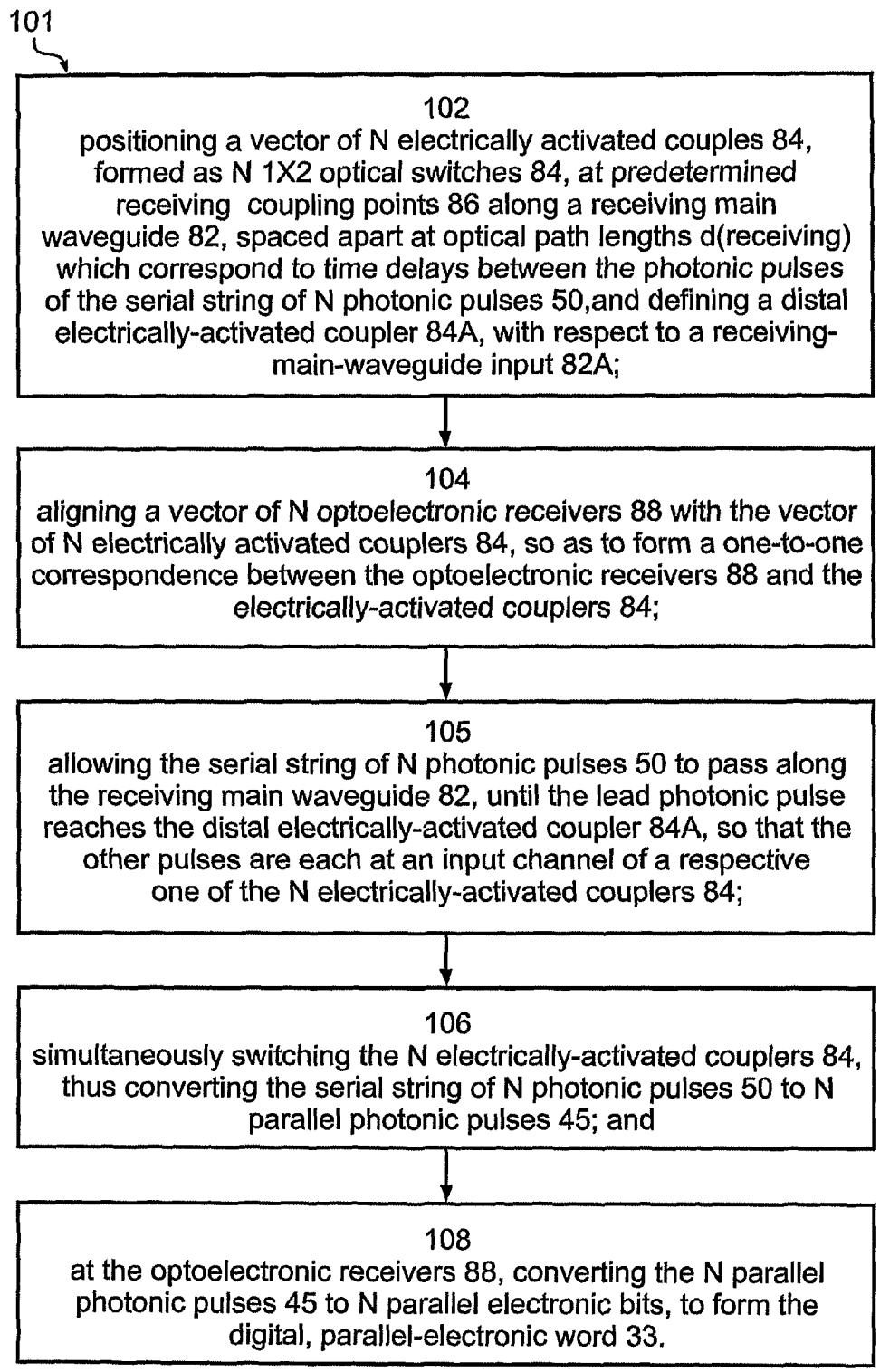
FIG. 3d is a flowchart of a receiving process, in accordance with embodiments of the present invention.

Referring further to the drawings, FIG. 3d is a flowchart of a method 101 for converting the digital, serial-optic word 50 to the digital, parallel-electronic word 33, according to embodiments of the present invention. The method 101 includes:

in a box 102: positioning a vector of N electrically activated couplers 84, formed as N 1×2 optical switches 84, at predetermined receiving coupling points 86 along a receiving main waveguide 82, spaced apart at optical path lengths d(receiving) which correspond to time delays between the photonic bits of the serial string of N photonic bits 50, and defining a distal electrically-activated coupler 84A, with respect to a receiving-main-waveguide input 82A;

in a box 104: aligning a vector of N optoelectronic receivers 88 with the vector of N electrically activated couplers 84, so as to form a one-to-one correspondence between the optoelectronic receivers 88 and the electrically-activated couplers 84;

in a box 105: allowing the serial string of N photonic bits 50 to pass along the receiving main waveguide 82, until the lead photonic bit reaches the distal electrically-activated coupler 84A, so that the other pulses are each at an input channel of a respective one of the N electrically-activated couplers 84;

in a box 106: substantially simultaneously switching the N electrically-activated couplers 84, thus converting the serial string of N photonic bits 50 to the N parallel photonic bits of the digital, parallel-optic word 45; and in a box 108: at the optoelectronic receivers 88, converting the N parallel photonic bits 45 to N parallel electronic bits, to form the digital, parallel-electronic word 33.

Referring further to the drawings, FIGS. 4a-4e schematically illustrate transmitting architectures 30, associated with a header signal 37, formed as at least one photonic bit 37, in accordance with embodiments of the present invention.

The purpose of the embodiments of FIGS. 4a-4d is to produce a photonic signal formed as the digital, serial-optic word 50 and the header photonic pulse 37 with a predetermined time delay between them, referred to henceforth as ΔT(Header and Word), or header time delay.

Figure 4A:
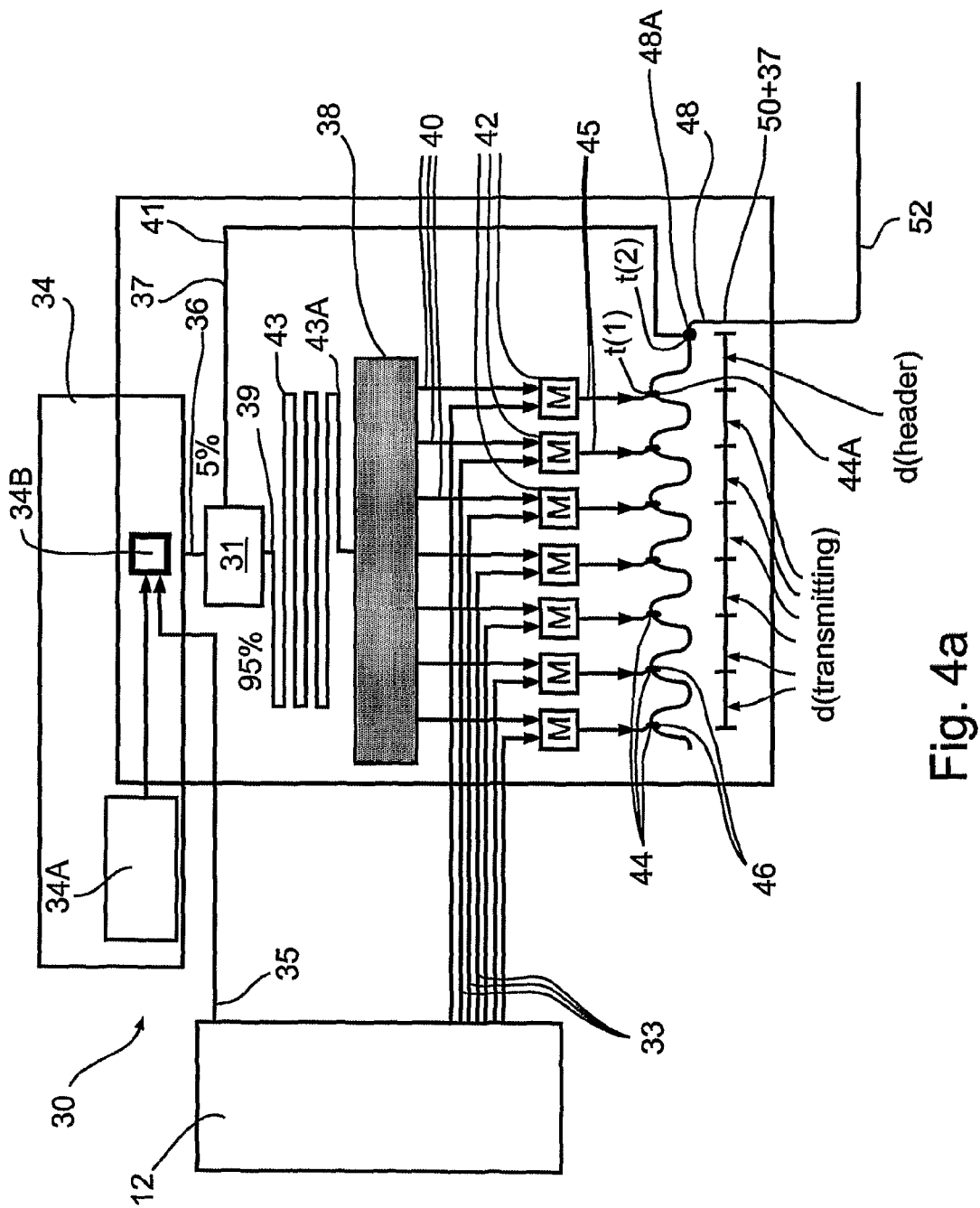
FIGS. 4a-4e schematically illustrate transmitting architectures, associated with header signals, in accordance with embodiments of the present invention.
Figure 4B:
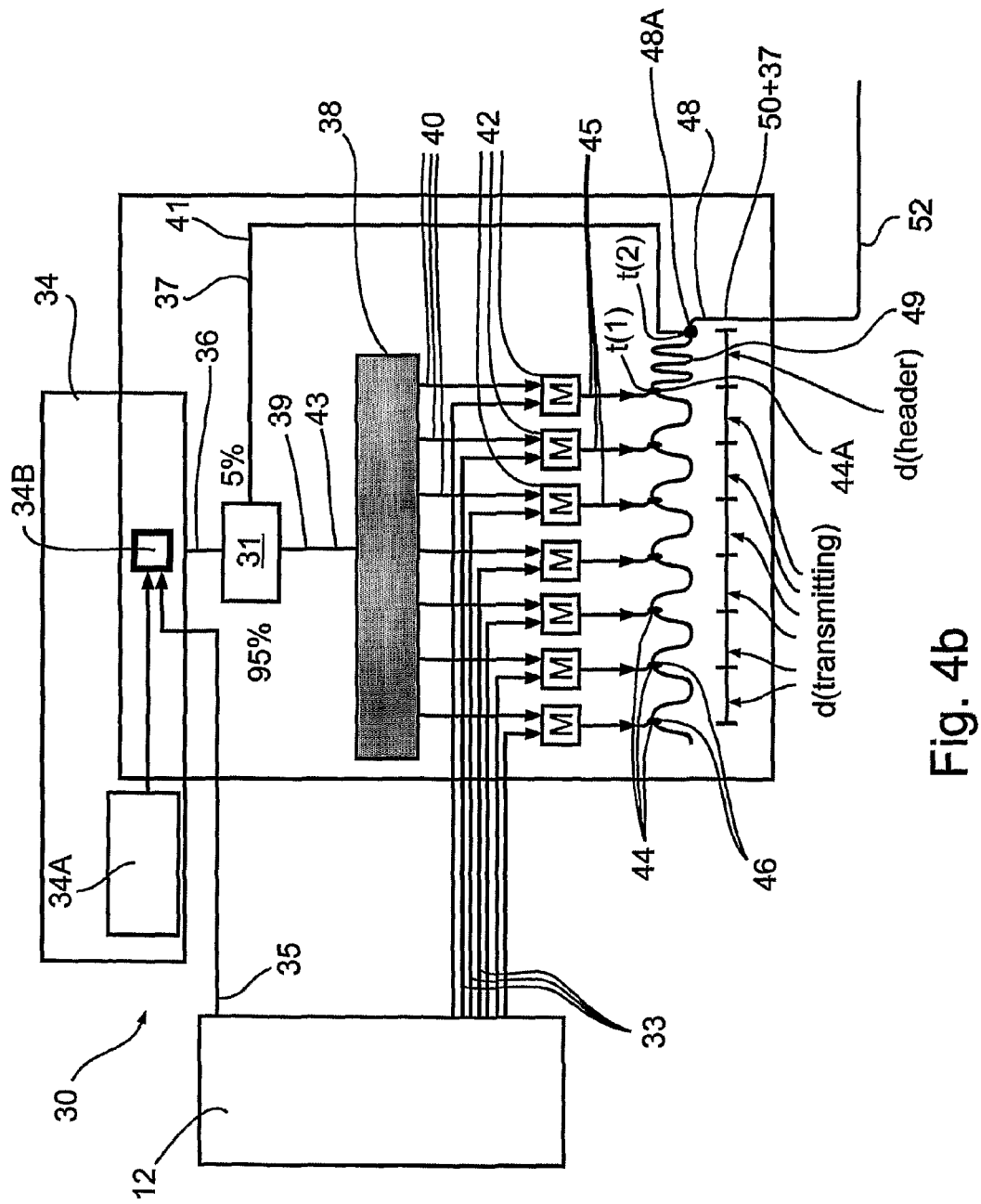
Figure 4C:
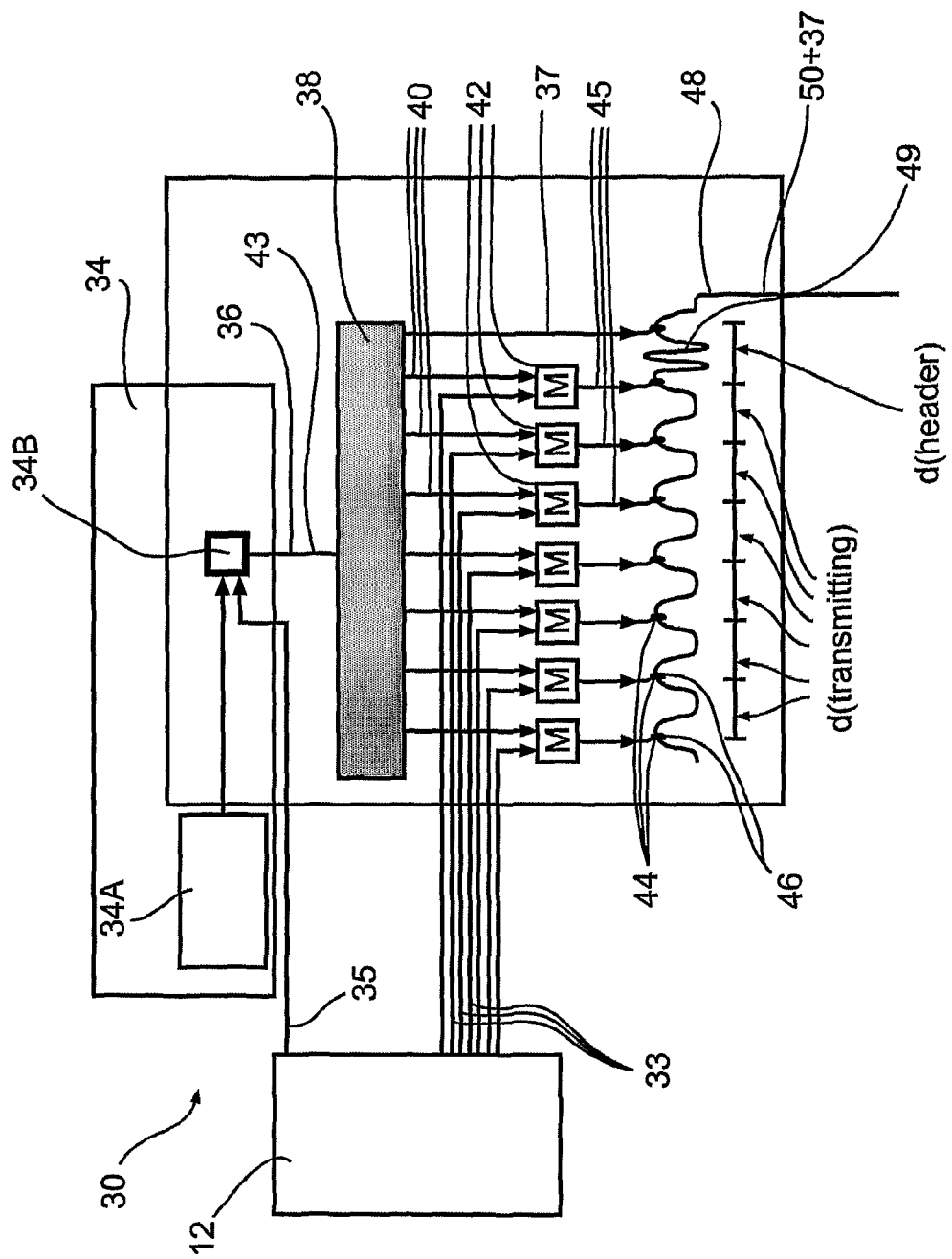
Figure 4D:
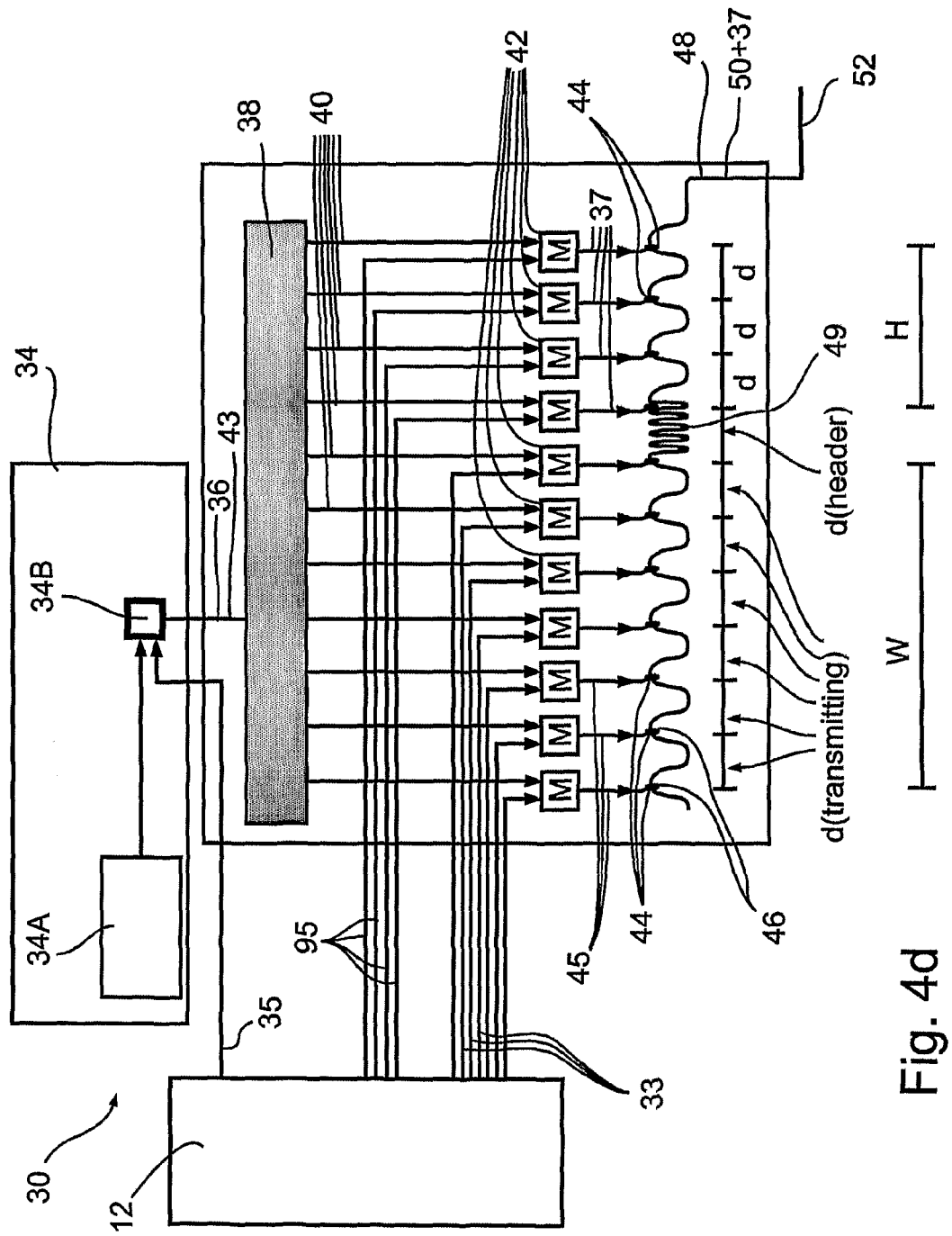
Figure 4E:
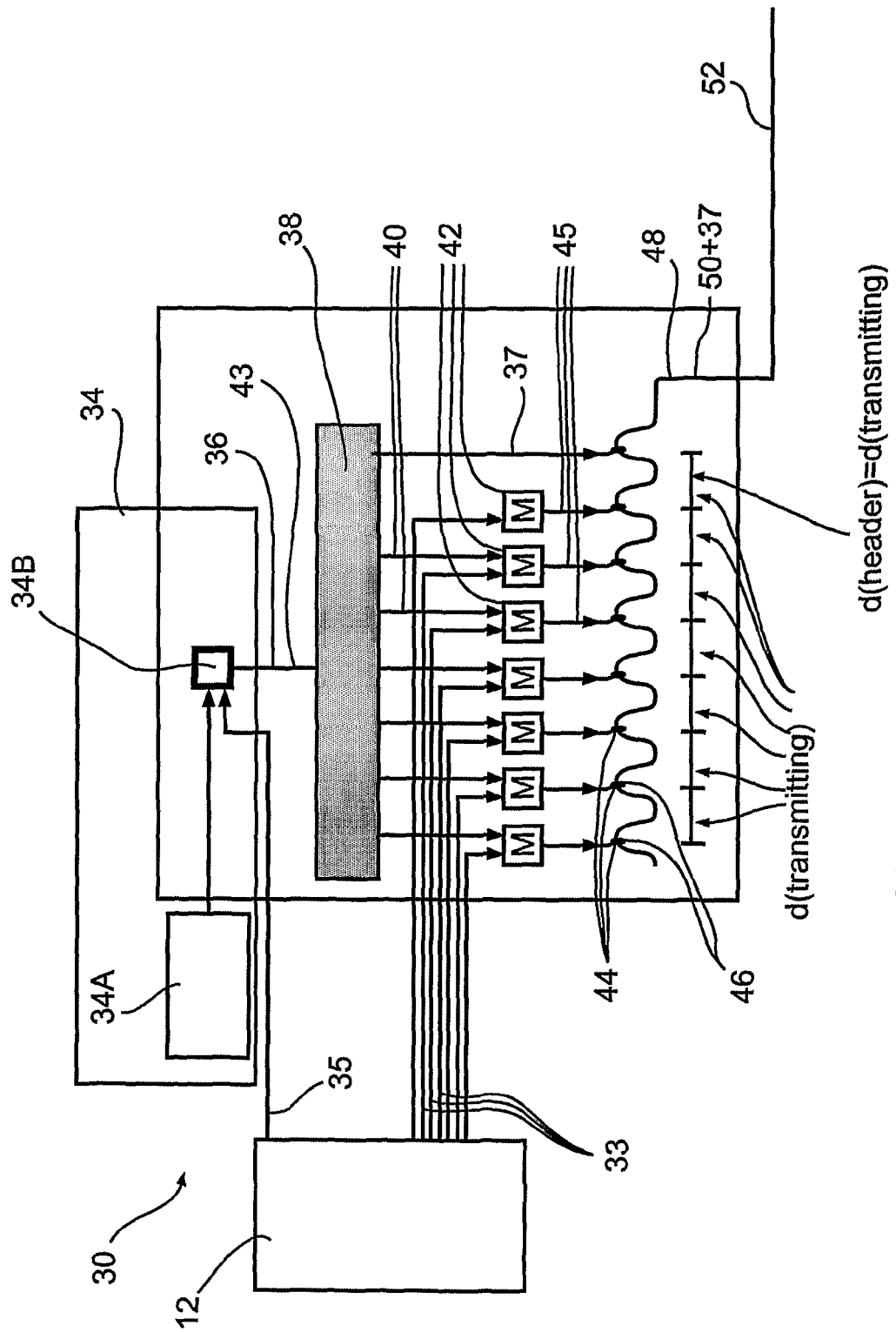

The purpose of the embodiment of FIG. 4e is to produce a photonic signal formed as the digital, serial-optic word 50 and the header photonic pulse 37 with the predetermined time delay between them which is substantially the serial-optic-word time delay, wherein additional delay may be provided at the receiving end, or the architecture is made to work without an additional time delay.

As seen in FIG. 4a, upon exiting the laser pulse source 34, the primary laser pulse 36 is directed to a beam splitter 31, which divides the primary laser pulse 36 to two pulses: the header photonic pulse 37 of about 2-5% of the energy of the primary pulse 36, and pulse 39 of about 98-95% of the energy of the primary pulse 36. The header photonic pulse 37 is directed via a waveguide 41 to the transmitting main waveguide 48 at a coupling point 48A, which is more proximal to the communicating waveguide 52 than a proximal directional couplers 44A, by an optical path length d(header). The purpose of the header photonic pulse 37 is to propagate ahead of the digital, serial-optic word 50, as a "dispatch" to alert the electrically activated couplers 84 to open when the digital, serial-optic word 50 arrives.

The pulse 39 is used for forming the digital, serial-optic word 50 and continues through a delaying section 43A which is longer than the waveguide 41 by a predetermined optical path length ΔL, for producing a time delay between the header signal 37 and the digital serial-optic word 50, which is substantially longer than the serial-optic-word time delay.

The delaying section 43A leads to the laser pulse divider 38, which divides the pulse 39 into the N parallel secondary laser pulses 40, each of 1/N of the energy of the laser pulse 39 and a substantially identical time profile as that of the laser pulse 39.

The total time delay between the header photonic pulse 37 and the digital, serial-optic word 50 ΔT(Header and Word), is determined by the difference between the time t(1), at which the header photonic pulse 37 reaches the coupling point 48A and the time t(2), at which the digital, parallel photonic bits 45 reaches the vector of N directional couplers 44, less than the time of photon propagation in the waveguide section d(header). The photonic propagation exiting the transmitting main waveguide 48 is formed of the digital, serial-optic word 50 and the header photonic pulse 37, separated by the predetermined ΔT(Header and Word).

In accordance with an another embodiment, illustrated in FIG. 4b, the waveguide 43 does not include the delaying section 43A; rather, the transmitting main waveguide 48 includes a delaying section 49 of a predetermined optical path length, as the length d(header), which is substantially longer than d(transmitting), for a substantially longer time delay than the serial-optic-word time delay. Again, the photonic propagation exiting the transmitting main waveguide 48 is formed of the digital, serial-optic word 50 and the header photonic pulse 37, separated by the predetermined ΔT(Header and Word).

In accordance with still another embodiment, illustrated in FIG. 4c, the primary laser pulse 36 proceeds directly to the laser pulse divider 38, where it is divided to N+1 secondary pulses 40, where N is the number of bits of the digital word, thus producing N photonic bits corresponding to the bits of the digital word and one additional pulse, for use as the header photonic pulse 37. Again, the transmitting main waveguide 48 includes a delaying section 49 of a predetermined optical path length, as the length d(header), and the photonic propagation exiting the transmitting main waveguide 48 is formed of the digital, serial-optic word 50 and the header photonic pulse 37, separated by the predetermined ΔT(Header and Word).

In accordance with yet another embodiment, illustrated in FIG. 4d, the primary laser pulse 36 proceeds to the laser pulse divider 38, where it is divided to N+m secondary pulses 40, where N is the number of bits of the digital word and m is the number of photonic bits for the header signal 37. Additionally, the m photonic bits for the header signal 37 may be modulated by the corresponding fast optical shutters 42, for example, according to signals 95, issued by the transmitting electronic processing element 12. The modulated m photonic bits for the header signal 37 may be separated by delay times associated with optical path lengths d along the transmitting main waveguide 48.

The reasons for producing the header signal 37 as a digital, serial-optic header 37 may be, for example:

1. Variations in ambient conditions, such as temperature and humidity, may cause variations in the optical path length of the delaying section 49 and thus in the actual time delay between the digital, serial-optic word 50 and the header signal 37. The digital, serial-optic header 37 may be used to augment the delaying section by one or several d optical path lengths. For example, given that m=4, the digital, serial-optic header 37 formed as 1, 0, 0, 0 will have no incremental addition to the delaying section;

the digital, serial-optic header 37 formed as 0, 1, 0, 0 will have an incremental addition of d to the delaying section 49;

and the digital, serial-optic header 37 formed as 0, 0, 0, 1 will have an incremental addition of 3d to the delaying section 49.

The transmitting electronic processing element 12 may thus control the optical path length of the delaying section 49, for example, based on the ambient conditions. Accordingly, the photonic propagation exiting the transmitting main waveguide 48 is formed of the digital, serial-optic word 50 and a single header photonic pulse 37, separated by a variable time delay ΔT(Header and Word), the variability being controlled by the transmitting electronic processing element 12.

2. A portion of the digital, serial-optic header 37 may be used to specify a receiver address, or to augment wavelength addressing, when more than one receiver has the same wavelength address.

It will be appreciated that portions of the digital, serial-optic header 37 may carry other information, as well.

In accordance with still another embodiment, illustrated in FIG. 4e, the digital, serial-optic word 50 and the header photonic pulse 37 are produced with the time delay which is about the same as that of the serial-optic word, so that d(header)=d(transmitting). Where necessary, an additional time delay may be provided at the receiving end, either to the electronic triggering signal 83 or to digital, serial-optic word 50, or to both.

It will be appreciated that other delay schemes are also possible.

Referring further to the drawings, FIGS. 5a-5f schematically illustrate receiving architectures 80, associated with the header photonic pulse 37 and the ΔT(Header and Word), in accordance with embodiments of the present invention.

Figure 5A:
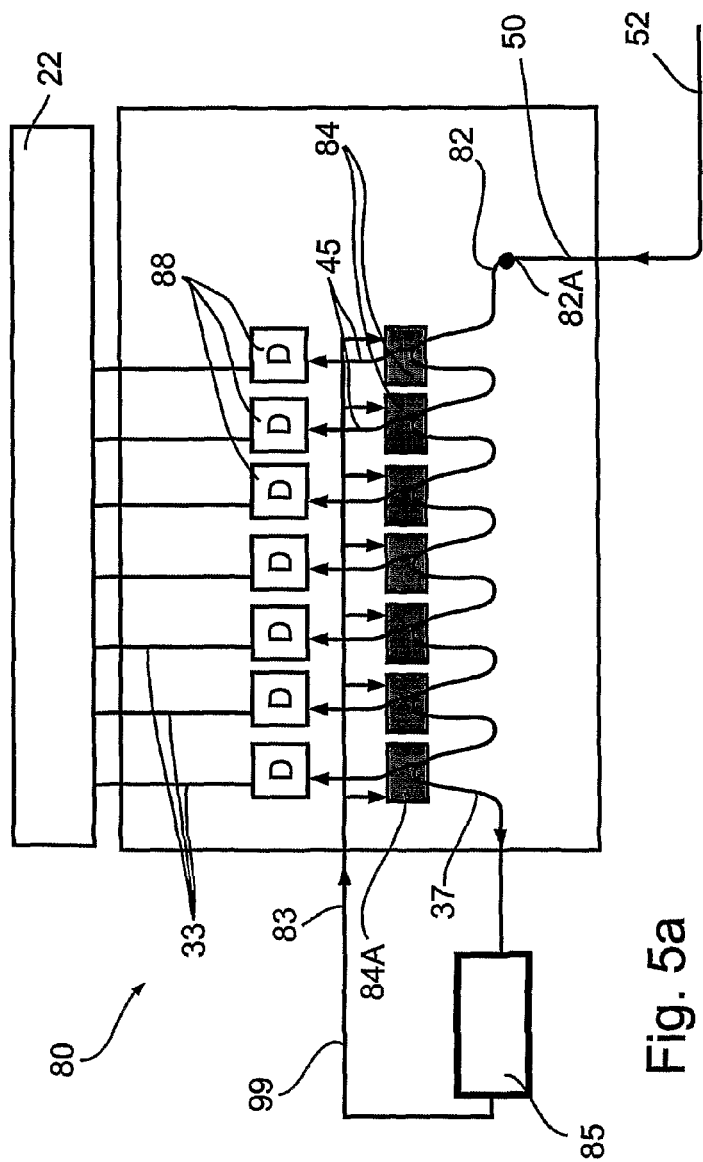
FIGS. 5a-5f schematically illustrate receiving architectures, associated with header signals, in accordance with embodiments of the present invention.

As seen in FIG. 5a, the header photonic pulse 37 propagates in the receiving-main-waveguide 82 from the receiving-main-waveguide input 82A, past the vector of N electrically activated couplers 84 and past the distal electrically activated coupler 84A, to a dedicated optoelectronic receiver 85, where it is converted to the electronic triggering signal 83, traveling in an electrical conduit 99, to trigger the N electrically-activated couplers 84 to open substantially simultaneously, when each of the optical bits of the digital, serial-optic word 50 is opposite its respective electrically activated couplers 84 (see FIGS. 3a and 3c).

The predetermined time delay ΔT(Header and Word) is calculated so that the electronic triggering signal 83 triggers the electrically activated couplers 84 to open substantially simultaneously, when each of the optical bits of the digital, serial-optic word 50 is opposite its respective electrically activated couplers 84, based on the transmitting and receiving and architectures.

Figure 5B:
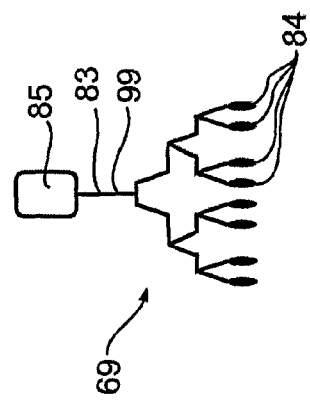

Preferably, as illustrated in FIG. 5b, the electrical conduit 99 is structured as a tree 69, to provide equal distances between the dedicated optoelectronic receiver 85 and each of the electrically-activated couplers 84, so that the electronic triggering signal 83 triggers the electrically activated couplers 84 substantially simultaneously. Other structures, such as 19A-19C of FIGS. 2b-2d, or others as known, may similarly be used.

Alternatively, the triggering is not simultaneous, and any one of the architectures taught hereinbelow, in conjunction with FIGS. 6a-6d may be employed to compensate for this effect.

Figures 5C, 5D:
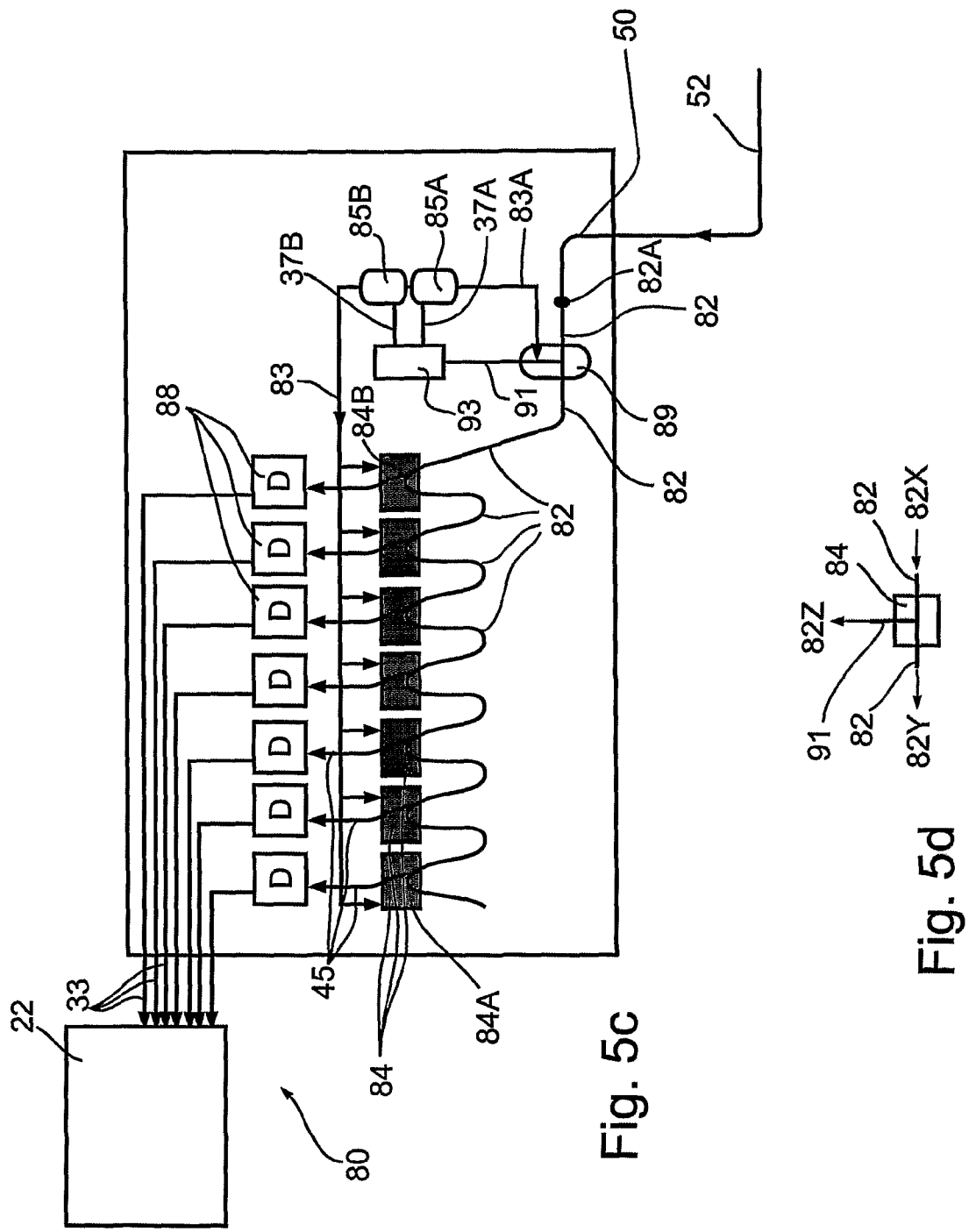

In accordance with another embodiment, seen in FIGS. 5c and 5d, an electrically activated coupler 89, for example, formed as a 1×2 optical switch 89, is positioned along the receiving main waveguide 82, between the receiving-main-waveguide input 82A and a proximal electrically activated coupler 84B.

The electrically activated coupler 89 includes the input 82X along the receiving main waveguide 82, the first output 82Y, also along the receiving main waveguide 82, and the second output 82Z, leading to a waveguide 91. Generally, the second output 82Z, which leads to the waveguide 91, is open, so upon arrival, the header photonic pulse 37 proceeds to the waveguide 91, and to a pulse divider 93, where it is divided to two pulses 37A and 37B.

The first pulse 37A proceeds to a dedicated optoelectronic receiver 85A, where it is converted to an electronic triggering signal 83A, which instructs the coupler 89 to close for a predetermined period of time $\Delta T(89)$, to allow the digital, serial-optic word 50, which follows the header photonic pulse 37, to continue along the receiving main waveguide 82. The predetermined period of time $\Delta T(89)$ is calculated based on the size of the digital, serial-optic word 50, the predetermined time delay in its arrival, as taught in FIGS. 4a-4d, the data transfer rate, and other relevant parameters, as known.

The second pulse 37B proceeds to a dedicated optoelectronic receiver 85B, where it is converted to the electronic triggering signal 83, which instructs the vector of N electrically activated couplers 84 to open substantially simultaneously, when each of the optical bits of the digital, serial-optic word 50 is opposite its respective electrically activated coupler 84.

Again, the predetermined time delay $\Delta T$(Header and Word) is calculated so that the electronic triggering signal 83 triggers the electrically activated couplers 84 to open substantially simultaneously, when each of the optical bits of the digital, serial-optic word 50 is opposite its respective electrically activated couplers 84 based on the transmitting and receiving and architectures. It will be appreciated that the predetermined time delay $\Delta T$(Header and Word) may be shorter than that of FIG. 5a, since the header photonic pulse 37 does not propagate along the receiving main waveguide 82.

Figure 5E:
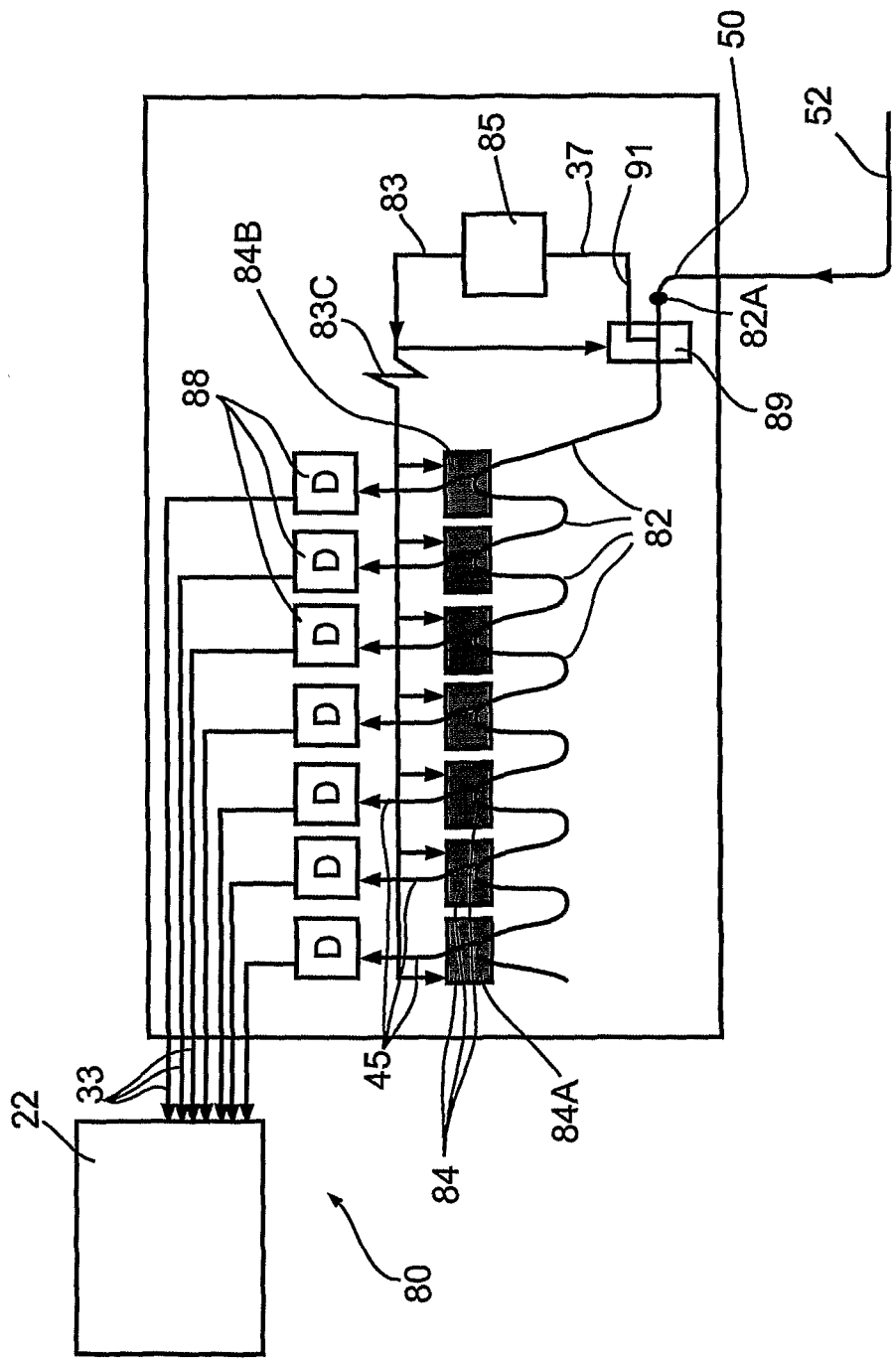

In accordance with still another embodiment, seen in FIG. 5e, the digital, serial-optic word 50 and the header photonic pulse 37 arrive at the receiving end without an added time delay between them, for example, as taught in conjunction with FIG. 4e. Rather, the delay is produced electronically, by a component 83C.

Accordingly, the coupler 89 is positioned along the receiving main waveguide 82, as has been taught in FIGS. 5c and 5d, for directing the header photonic pulse 37 to the optoelectronic receiver, where it is converted to the electronic triggering signal 83.

The electronic triggering signal 83 triggers the coupler 89, to direct incoming photons along the receiving main waveguide 82, for the predetermined period of time $\Delta T(89)$, as has been taught in conjunction with FIG. 5c.

Additionally, the electronic triggering signal 83 triggers the N electrically-activated couplers 84, after a delay produced by a component 83C, so that the N electrically-activated couplers 84 open substantially simultaneously, when each of the optical bits of the digital, serial-optic word 50 is opposite its respective electrically activated coupler 84.

Figure 5F:
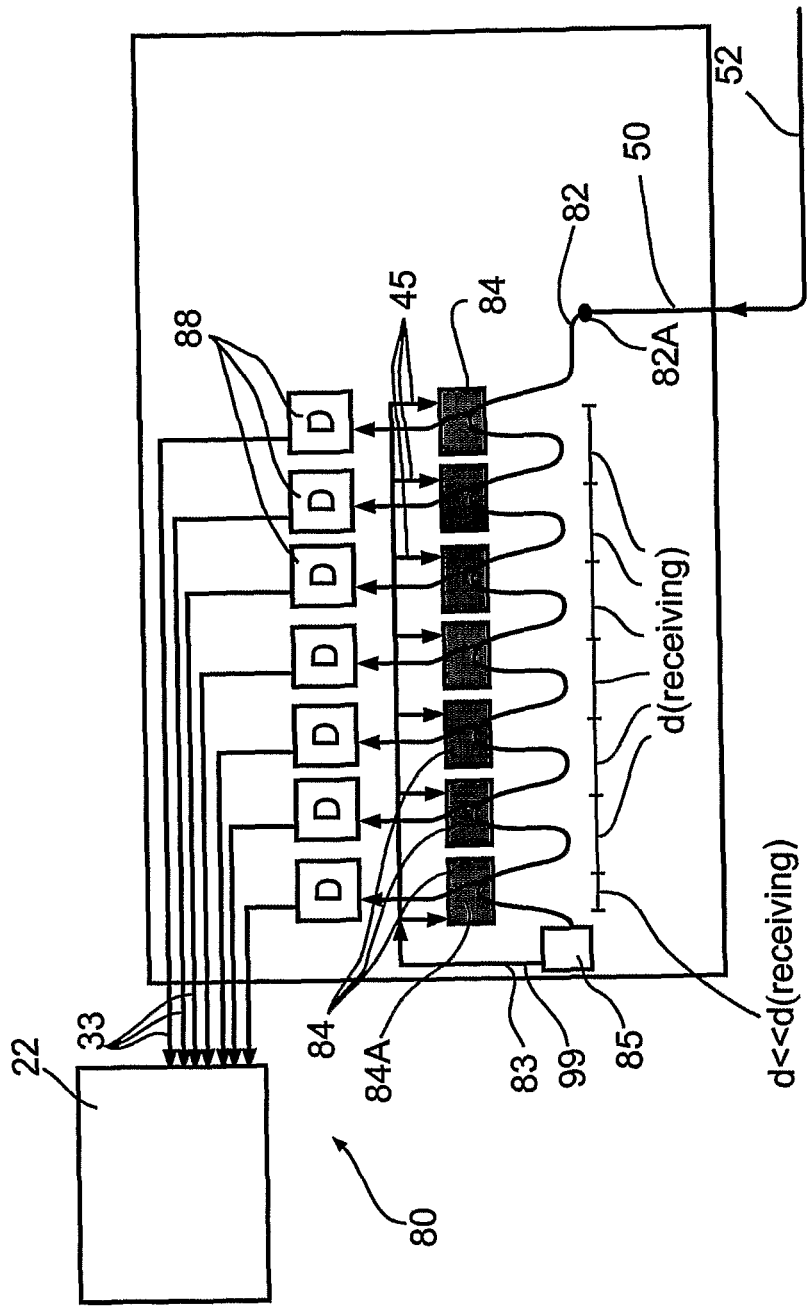

In accordance with yet another embodiment, seen in FIG. 5f, the digital, serial-optic word 50 and the header photonic pulse 37 are constructed at the transmitting end such that d(header)=d(transmitter). Yet, at the receiving end, d(header) <<d(receiver), wherein the header photonic pulse 37 propagates beyond the distal electrically activated coupler 84A to the dedicated optoelectronic receiver 85 for a time duration that is shorter than the serial-optic-word time delay, by the electronic response time of the dedicated optoelectronic receiver 85 and the time for the electronic triggering signal 83 to reach the distal electrically activated coupler 84A, so as to trigger the distal electrically activated coupler 84A just as the lead photonic pulse of the digital, serial-optic word 50 arrives there.

Referring further to the drawings, FIGS. 6a-6d schematically illustrate transmission and receiving architectures, wherein the fast optical shutters 42 are not activated simultaneously, or the electrically activated couplers 84 are not activated simultaneously, or coupling at the directional couplers 44 is not simultaneous, in accordance with embodiments of the present invention.

Figure 6A:
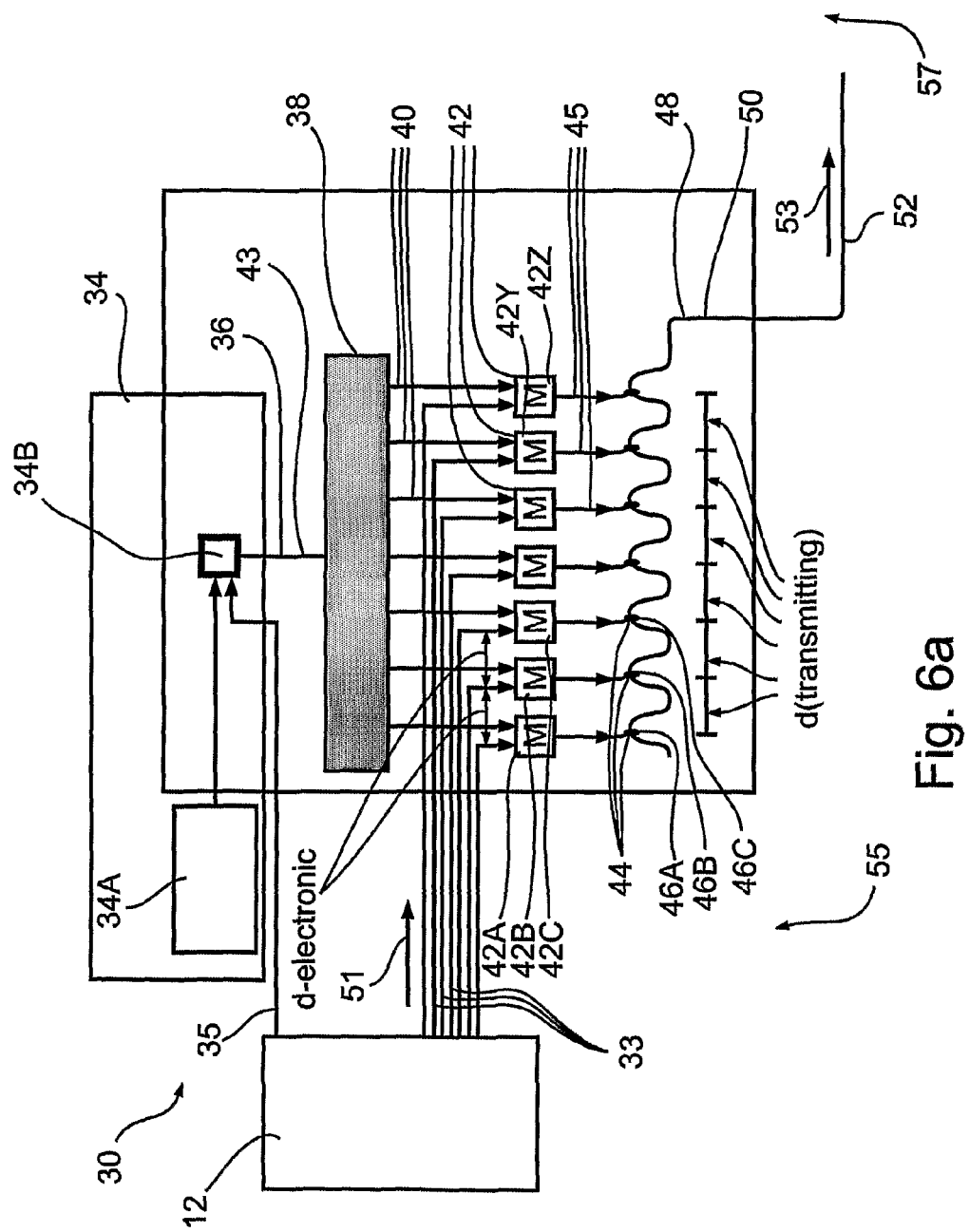
Figure 6B:
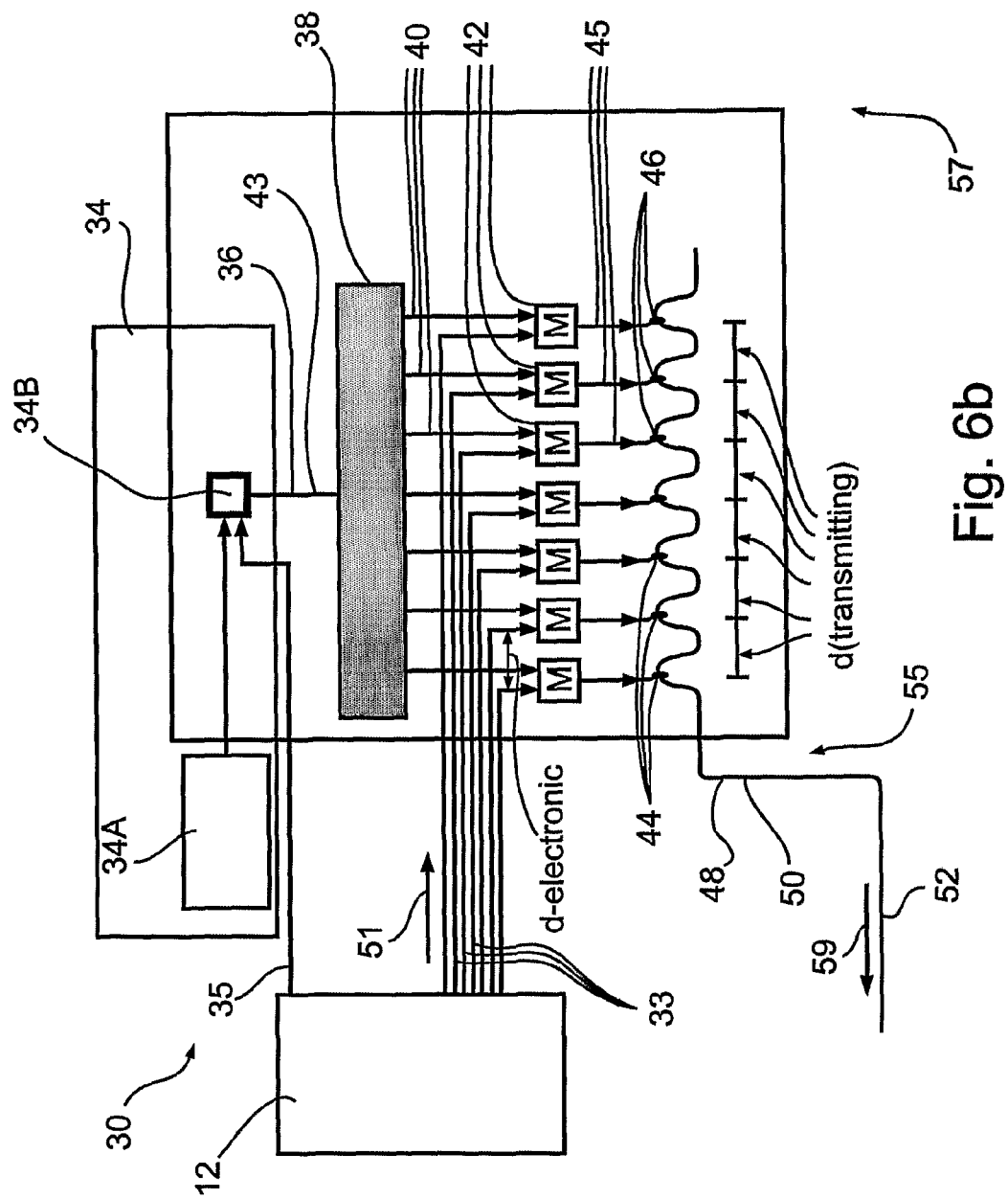

FIGS. 6a and 6b illustrate two transmitting geometries, for consideration of the transmitting end.

In FIG. 6a, the transmitting electronic processing unit 12 is at a first side 55 and the communicating waveguide 52 exits from a second side 57. The direction of photonic motion is described by an arrow 53 and is in the same direction as the electronic motion, described by an arrow 51.

A fast optical shutter 42A, at the first side 55, communicates with its respective electronic bit of the parallel-electronic word 33 a little before the fast optical shutter 42B, forming the first photonic bit a little before the fast optical shutter 42B forms the second photonic bit. The first photonic bit begins to propagate along the transmitting main waveguide 48 before the second photonic bit is formed.

Denoting the time associated with an electronic path length between adjacent fast optical shutters as t(d-electronic), then the photonic propagation of the first photonic bit along the transmitting main waveguide 48, before the production of the second photonic bit, occurs for a duration of t(d-electronic), while the photonic propagation of the first photonic bit before the production of the last photonic bit occurs for the duration of for (N−1)×t(d-electronic). For example, given a digital word of 64 bits, that duration is 63×t(d-electronic).

In consequence, for the geometry of FIG. 6a, the actual time delays between adjacent photonic bits of the digital, serial-optic word 50 are decreasingly shorter, by steps of t(d-electronic).

On the other hand, for the geometry described in FIG. 6b, the transmitting electronic processing unit 12 is on the first side 55 and the communicating waveguide 52 exits from the same side 55. The direction of photonic motion is described by an arrow 59 and is in opposition to the electronic motion, described by the arrow 51.

In consequence, for the geometry of FIG. 6b, the actual time delays between adjacent photonic bits of the digital, serial-optic word 50 are increasingly longer, by steps of t(d-electronic).

Figure 6C:
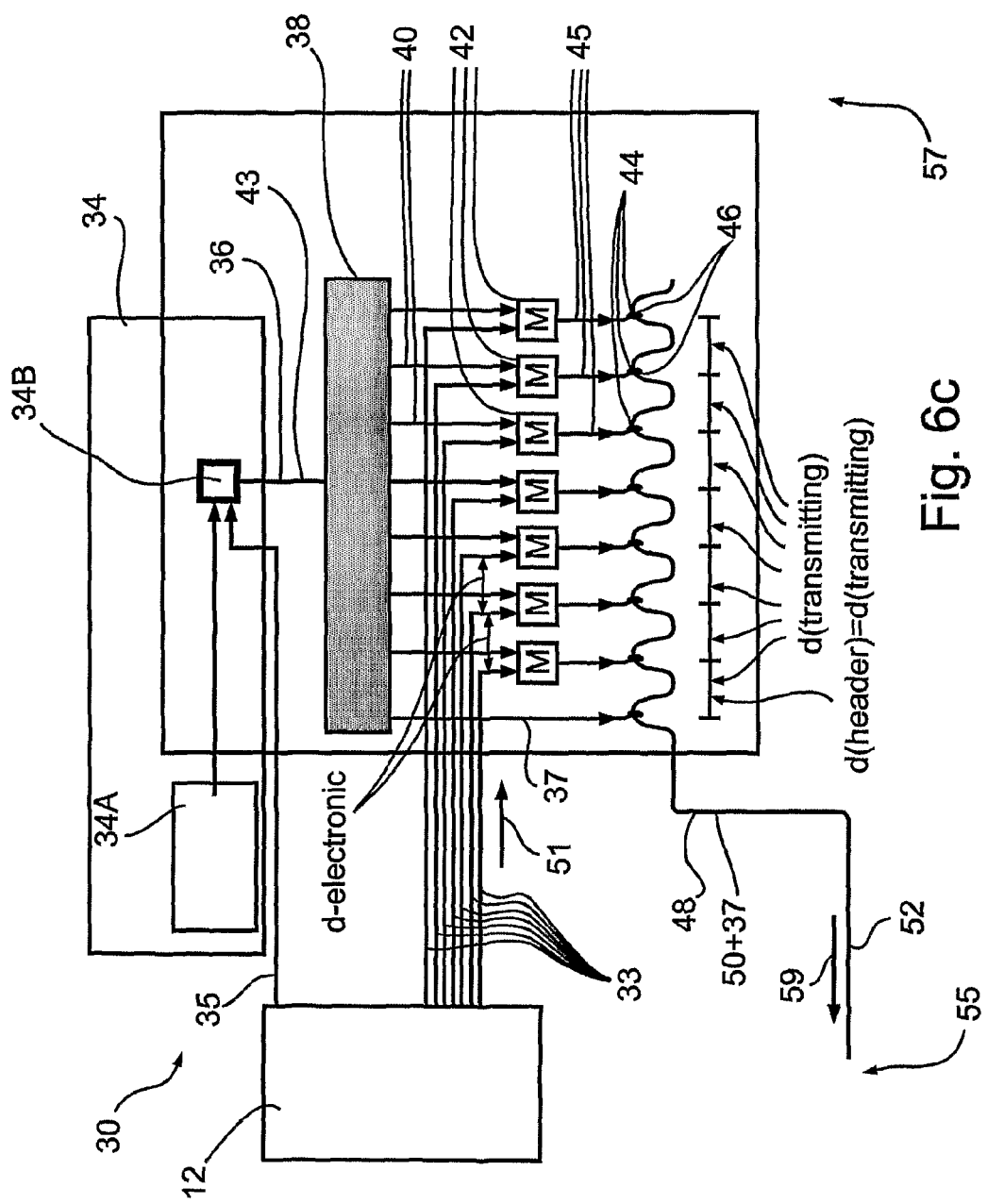

FIG. 6c is similar to FIG. 6b, but includes the header signal 37—the header photonic pulse 37 ahead of the lead photonic bit of the digital, serial-optic word 50 by the time associated with d(header)=d(transmitting). In FIG. 6c as well, the actual time delays between adjacent photonic bits of the digital, serial-optic word 50 are increasingly longer, by steps of t(d-electronic).

The receiving-end situation is illustrated in FIG. 6d, where the electronic triggering signal 83 propagates from a first side 61 to a second side 63, in opposition to the direction of propagation of the digital, serial-optic word 50.

Given the digital, serial-optic word 50 with substantially equal time delays between successive photonic bits, and given substantially equal optical path lengths between adjacent electrically activated couplers 84, the optical bits of the digital, serial-optic word 50 arrive at their respective electrically activated couplers 84 simultaneously. Yet, in accordance with the geometry of FIG. 6d (unlike that of FIG. 5b) the electronic triggering signal 83, which is arranged to trigger the electrically activated coupler 84A of the first side 61 in time, cannot at the same time trigger the electrically activated coupler 84Z of the second side 63, because the geometry of FIG. 6d does not provide for equal electronic path lengths and, the electronic triggering signal 83 has not reached the electrically activated coupler 84Z yet.

A solution for this geometry (FIG. 6d) may be to produce the digital, serial-optic word 50 with increasingly longer time delays between successive photonic bits, so that each pulse arrives at its respective electrically activated coupler 84A just as the electronic triggering signal 83 arrives there.

This is what the geometry of FIG. 6c produces.

Given the transmitting architecture of FIG. 6c and the receiving architecture of FIG. 6d, and given that the electronic path lengths d-electronic are matched between the transmitting and receiving architectures 30 and 80 respectively, the digital, serial-optic word 50 does not arrive at the electrically activated couplers 84 simultaneously. Rather, there is a time delay of t(d-electronic) between the arrival of successive photonic bits to their respective electrically activated coupler 84, and this time delay is substantially matched by the time delay of t(d-electronic), which the electronic triggering signal 83 (FIG. 6d) requires in order to reach the respective electrically activated coupler 84. Thus, each successive photonic bit arrives at its respective electrically activated coupler 84, just as the electronic triggering signal 83 triggers it.

In other words, the electrically activated coupler 84A is activated first, and the electrically activated coupler 84B is activated later by a time delay t(d-electronic), just as the second photonic bit of the digital, serial-optic word 50 reaches it.

Yet, there remains a problem: the N photonic bits of the digital, parallel-optic word 45 are produced in succession rather than simultaneously, so that in effect, the digital, parallel-optic word 45 is not truly parallel. To compensate for the successive delays in the production of the photonic bits, waveguides of the digital, parallel-optic word 45, such as waveguides 45A, 45B, 45C, . . . 45Z, may have optical path lengths d(45A), d(45B), d(45C), . . . d(45Z), designed so as to gradually decrease in length:

d(45A)>d(45B)>d(45C)> . . . >d(45x)>d(45Y)>d(45Z),

Thus, the photonic bit produced first propagates through the longest optical path length d(45A), and the photonic bit produced last propagates through the shortest optical path length d(45Z), such that all the photonic bits arrive at their respective optoelectronic receivers 88 simultaneously.

It will be appreciated that the bus of the parallel electronic bits of the digital, parallel-electronic word 33 is formed of conduits 33A of substantially equal lengths, and the parallel electronic bits of the digital, parallel-electronic word 33 arrive at the receiving electronic processing element 22 substantially simultaneously.

An alternative approach to FIGS. 6c and 6d is to produce the transmitting main waveguide 48 and the receiving main waveguide 82 with coupling points that are increasingly longer apart, or decreasing shorter apart, depending on the geometry, so as to substantially compensate for the electronic effect, the result being digital, serial-optic words 50 of substantially equal time delays between photonic bits. In such cases, no specific matching between transmitting and receiving architectures is needed.

It will be appreciated that the effect illustrated in FIGS. 6a-6d may be avoided by using any one of the architectures 19A-19C of FIGS. 2b-2d, or another as known, for simultaneous coupling at the directional couplers 44, and by using the architecture 69 of FIG. 5b the architectures 19A-19C of FIGS. 2b-2d, or another as known, for simultaneously activating the electrically activated couplers 84.

Figure 7A:
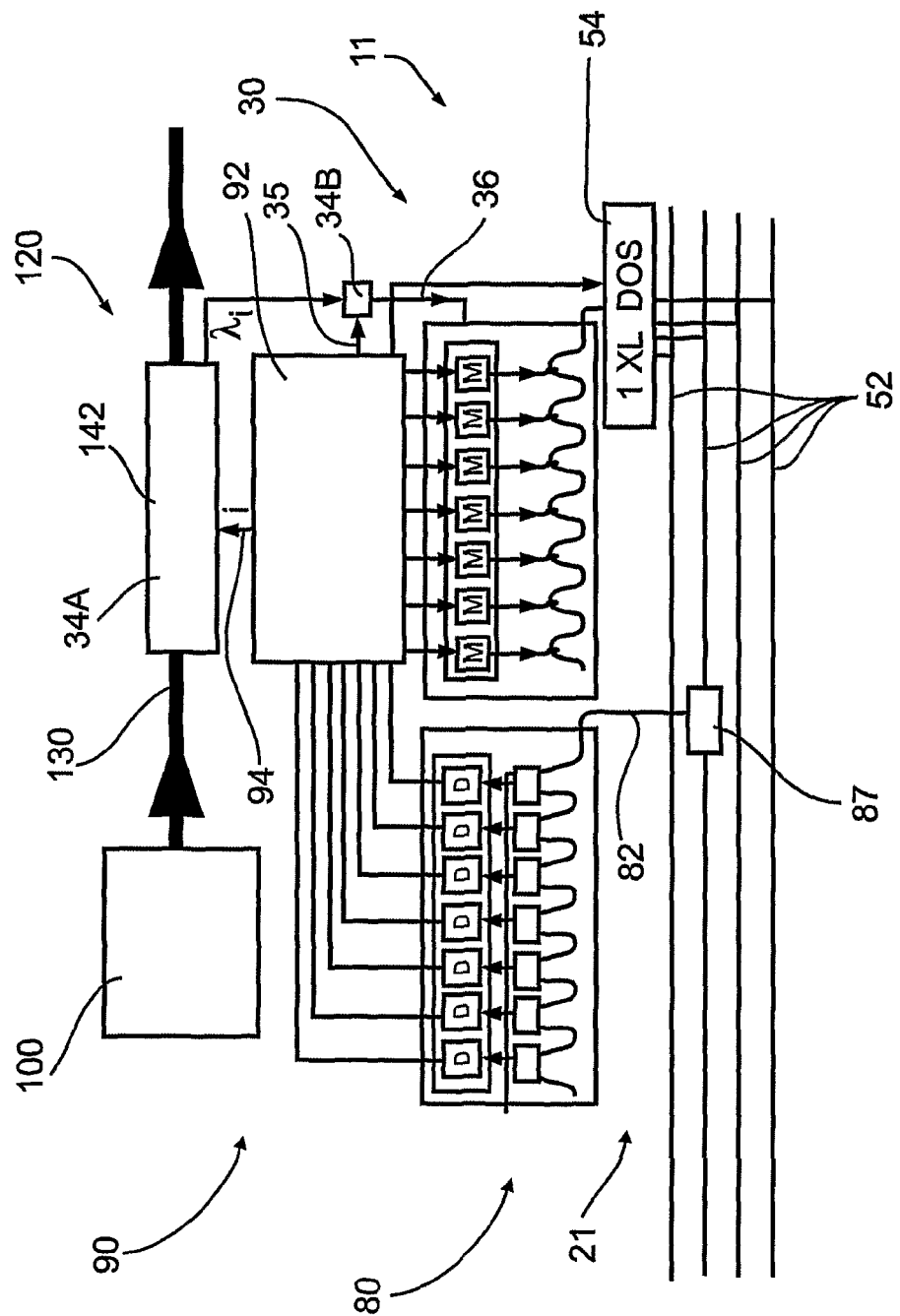
FIGS. 7a and 7b are representations of an overall communication architecture, in accordance with embodiments of the present invention.
Figure 7B:
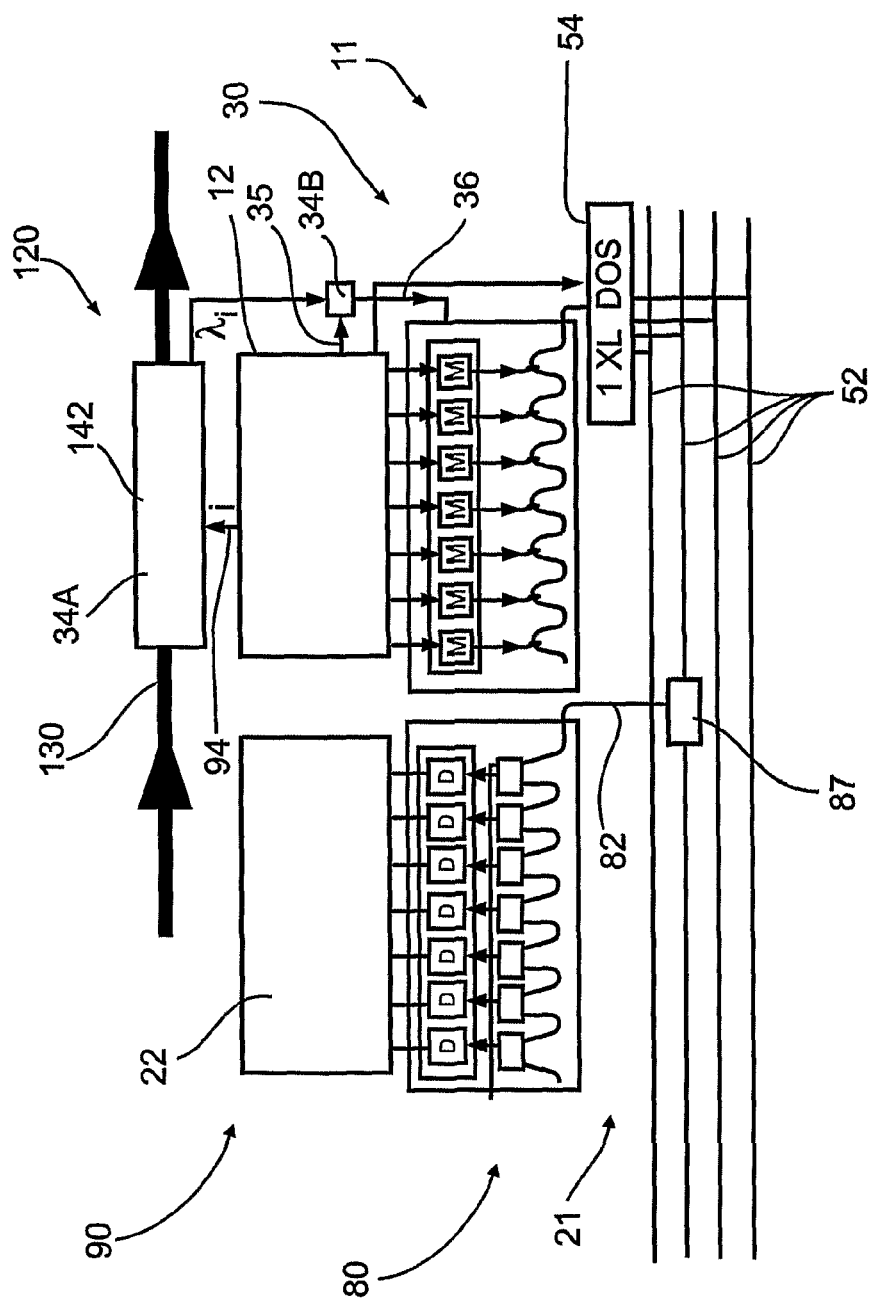

Referring further to the drawings, FIGS. 7a and 7b are schematic representations of a communication architecture 90 which includes the transmitting and receiving architectures 30 and 80.

Preferably, the communicating waveguides 52 employ wavelength division multiplexing (WDM). Furthermore, the communicating waveguides 52 may employ wavelength addressing.

As has been illustrated in conjunction with FIG. 7a, the channel drop WDM filter 87, at the receiving end 21, drops a digital, serial-optic word of a predetermined wavelength—the wavelength address associated with the receiver, into the receiving main waveguide 82.

The communication architecture 90 of FIG. 7a illustrates a single processing element 92, involved in the transmitting and the receiving.

Alternatively, the communication architecture 90 of FIG. 7b illustrates different transmitting and receiving processing elements, such as the transmitting and receiving processing elements 12 and 22.

Preferably, both the transmitting and receiving processing elements 12 and 22 are digital electronic processing units (EPUs), referred to herein as digital electronic network nodes, each being, for example, a chip, a printed circuit board (PCB), a rack, or a cabinet.

It will be appreciated that the architectures described herein operate at a rate which is synchronized with the operating rate of the EPU.

The communication may be between any one of a chip, a PCB, a rack, or a cabinet on the transmitting side and any one of a chip, a PCB, a rack, or a cabinet on the receiving side. The communication may be intra-board, that is within a single board, or inter-board, between boards. The communication may be intra-cabinet, that is, within a single cabinet, or inter-cabinet, between cabinets.

In accordance with a preferred embodiment of the present invention, a laser power grid 100 may be employed for providing a laser beam of a distinct wavelength, via a laser distribution grid 130. The laser power grid 100 is operative in the same way as the laser power source 34A, for providing a laser beam to the triggering fast optical shutter 34B, to produce the laser pulse 36 upon the trigger 35. However, unlike the situation in FIGS. 2a and 2e, the processing element 92 (FIG. 7a) or 12 (FIG. 7b) sends an electronic request 94 to the laser power grid 100, specifying a wavelength, for example, based on a receiving address, when using wavelength addressing.

The electronic request 94 is received by an optical-switch array 120 along the laser distribution grid 130 of the laser power grid 100, described hereinbelow, in conjunction with FIGS. 8a-8c, for providing a laser beam of a distinct wavelength. Preferably, a specific optical switch of the optical-switch array 120, for example, an optical switch 142, is associated with the processing element 92 (FIG. 7*a*) or 12 (FIG. 7*b*).

The laser power grid 100 is described in commonly owned WO2004/070978, whose disclosure is incorporated herein by reference. It describes a system for supplying a plurality of laser beams of different wavelengths, for operation with data networks, employing WDM multiplexing, and incorporating wavelength addressing. The laser power grid includes a laser power supply station, comprising a plurality of continuous-work laser sources; a laser distribution grid, formed as an optical fiber, or as a plurality of optical fibers, for distributing light propagations of different wavelengths throughout a data network, to supply it with laser power; and an optical switching network, coupled to the laser distribution grid, for turning the laser power on, locally, where it is needed. The laser power grid replaces systems of tunable lasers in known data networks; it is considerably faster and cheaper than systems of tunable lasers and produces less waste heat within the data network surroundings. The laser power grid incorporates parallel fast optical communication in complex multi-node communication and computer networks and enables the implementation of burst switching and packet switching by wavelength addressing. It is particularly cost effective as the routing paradigm in inter-chip, inter-board, and inter-cabinet applications, as well as between distant sites, in a wide spectrum of applications, in both the telecom and datacom arenas.

Referring further to the drawings, FIGS. 8*a*-8*c* are schematic representations of the laser power grid 100, for providing laser power of a plurality of wavelengths to the processing element 92 (FIG. 7*a*) or 12 (FIG. 7*b*), in accordance with the present invention.

The laser power grid 100 includes a laser power supply station 110, which includes a plurality M of continuous-work (cw) laser sources, 112, 114, 115, 116, and 118, each producing a light propagation of a distinct wavelength $\lambda_2$, $\lambda_4$, $\lambda_5$, $\lambda_6$, and $\lambda_8$, respectively.

Preferably, the laser sources 112, 114, 115, 116, and 118 are fixed wavelength laser sources. Alternatively, they may be tunable lasers.

Additionally, the laser power grid 100 includes the laser distribution grid 130, which issues from the laser power supply station 110, for example, in a plurality of optical fibers 132, 134, 135, 136, and 138, though a single fiber may be used. The single optical fiber or the plurality of optical fibers may be single-mode or multimode fibers.

Furthermore, the laser power grid 100 includes an optical switching network 140, coupled to laser distribution grid 130, for allocating laser power of a required wavelength, locally, as needed.

The optical switching network 140 includes a plurality N of optical-switch arrays, 142, 144, 145, and 146, each serving one EPU. Thus the number of optical-switch arrays should equal the number of EPUs in the data network.

Additionally, as seen in FIGS. 8*b* and 8*c*, each optical-switch array, such as optical-switch array 142, may include a plurality M of optical switches, 122, 124, 125, 126, and 128, M being the number of light propagations which are distributed by laser power grid 100. The optical switches are coupled to the laser distribution grid 130.

Several geometries may be employed for coupling laser distribution grid 130 to the optical-switch array 120, comprising optical switches, 122, 124, 125, 126, and 128.

FIGS. 8*c*-8*c* illustrate a situation in which laser distribution grid 130 includes optical fibers 132, 134, 135, 136, 138, each transmitting a single light propagation, and each coupled to a single optical switch, the switch being adapted to deflect the light propagation carried by the optical fiber. Thus, optical fibers 132, 134, 135, 136, and 138 are coupled to optical switches 122, 124, 125, 126, and 128 respectively, for deflecting light propagations of wavelengths $\lambda_2$, $\lambda_4$, $\lambda_5$, $\lambda_6$, and $\lambda_8$, respectively, responsive to input signals.

As FIGS. 8*a*-8*c* illustrate, electric switches 162, 164, 165, 166, and 168 provide individual control to optical switches 122, 124, 125, 126, and 128, respectively. At a certain moment, the array 120 may respond to an input signal to optical switch 125, deflecting the light propagation of wavelength $\lambda_5$, as seen in FIG. 8*c*. At another moment, array 120 may respond to an input signal to optical switch 128, deflecting the light propagation of wavelength $\lambda_8$.

In this manner, a laser beam of a predetermined wavelength is provided to the triggering fast optical shutter 34B of FIG. 7*a* or 7*b*.

It will be appreciated that tunable lasers may be used in place of the laser power grid 100, to supply the architectures 30, 80, and 90 with laser beams of different wavelengths.

The electroabsorption modulators, in accordance with embodiments of the present invention may be, for example, as taught by Devaux, F., et al., "Electroabsorption modulators for high-bit-rate optical communications: a comparison of strained InGaAs/InAlAs and InGaAsP/InGaAsP MQW," TOPICAL REVIEW, Semicond. Sci. Technol. 10 (1995) 887-901.

The electrooptical modulators, in accordance with embodiments of the present invention, may be, for example, as taught by Handbook of Optics, Michael Bass Editor in Chief., Vol. 4: Fiber Optics and Nonlinear Optics, Chapter 12: Optical Time Division Multiplexed Communication Networks, pp. 32-33: Electrooptic modulators. McGraw Hill-2001 ISBN 0-07-136456-0

The optoelectronic receivers, in accordance with embodiments of the present invention, may be, for example, as taught by Fiber-Optic Communication Systems, Third Edition, Govind E. Agrawal, Chapter 4: Optical Receivers, a John Wiley & Sons, Inc., Publication (2002), ISBN 0-471-22114-7

The direction couplers, in accordance with embodiments of the present invention, may be, for example, as taught by Norio Kashima in, "Passive optical components for optical fiber transmission," Ch. 10: Optical Coupler and Branch Section 10.1 Directional coupler (pp. 225-244), 1995 Artech house inc.

Viable fabrication technologies for ORTA, in accordance with embodiments of the present invention are described below.

i. KLTN Based Alpha Waveguides;

KLTN based alpha waveguides involve constructing three dimensional structures in the KLTN crystals, by implanting high velocity ions that generate amorphous structures, having a feature size of about 300 nm and an index of refraction of between about 5% and 10% less than the substrate KLTN. [A. Gumennik, A J. Agranat, I. Shachar and M. Hass, "Thermal stability of a slab waveguide implemented by α particles implantation in KLTN". Appl. Phys. Lett. 87 (25): Art. No. 251917 (Dec. 19, 2005).] The substrate KLTN crystal can be grown by Metalo Organic Chemical Vapor Deposition on Silicon or silica substrate. [M. Sasaura, K. Fujiura, K. Enbutsu, T. Imai, S. Yagi, T. Kurihara, M. Abe, S. Toyoda, and E. Kubota, US Patent Application 0072550 (2003).] The superior optical switching capabilities of KLTN based ORTA devices make this technology the most likely candidate for complex implementation of ORTA, such as those incorporating the laser power grid.

ii. Silicon Photonics:

Silicon Photonics relates to the fabrication of electrooptic devices by silicon-based VLSI technology and has recently been given substantial attention. Several approached are under development, for example, by INTEL. [A. S. Liu, R. Jones, L. Liao et al. "*A high-speed silicon optical modulator based on a metal-oxide-semiconductor capacitor*", NATURE 427 (6975): 615-618 Feb. 12, 2004.]

In general, the performance envelope of silicon based photonic devices has hitherto lagged behind devices fabricated by other technologies. However, the possibility of using the advanced VLSI fabrication methodology will be essential for harnessing ORTA for chip-to-chip applications.

iii. InP/GaAs Based Devices:

InP/GaAs based devices have been the main technologies for fabricating optoelectronic devices for optical communication systems [L. A. Coldren, and S. W. Corzine, "Diode Lasers and Photonic Integrated Circuits", John Wiley and Sons (1995).] This makes InP/GaAs based devices natural candidates for fabricating basic ORTA devices.

ORTA devices, based on any one of, or all of the three technologies may be applicable, in accordance with the present invention.

As used herein, the term "substantially" refers to ±15%.

As used herein, the terms "about," and "generally" refer to ±30%.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A plurality of the transmitting architectures, each transmitting architecture for converting a digital, parallel-electronic word, represented by N parallel electronic bits, to a digital, serial-optic word, represented as a serial string of N photonic bits, the transmitting architecture comprising:

a transmitting source for the digital, parallel-electronic word of the N parallel electronic bits, each bit being characterized as either an "0" bit or an "1" bit, the source further providing a trigger, synchronized with the digital, parallel-electronic word;

a laser pulse source comprising: a laser configured to provide laser beams at a plurality of distinct wavelengths, said laser pulse being adapted for providing, upon request, a laser beam of a distinct wavelength; and a triggering fast optical shutter for producing a primary laser pulse upon receiving the trigger;

a laser pulse divider, for receiving and dividing said primary laser pulse to N parallel secondary laser pulses;

a vector of N fast optical shutters, each configured for optical communication with one of the N parallel secondary laser pulses and for signal communication with one of the N electronic bits, thereby allowing passage of the secondary laser pulses for any "1" electronic bit and preventing passage for any "0" electronic bit of the digital, parallel-electronic word, thus producing a digital, parallel-optic word, represented as N parallel photonic bits; and a vector of N directional couplers positioned at predetermined transmitting coupling points along a transmitting main waveguide and aligned with the vector of said N fast optical shutters, so as to form a one-to-one correspondence between the fast optical shutters and the directional couplers, wherein transmitting optical path lengths between the transmitting coupling points along the transmitting main waveguide produce serial-optic-word time delays between the individual pulses of the N parallel photonic bits, thus producing the serial string of the N photonic bits, representing the digital, serial-optic word;

wherein each of the plurality of transmitting architectures operates at a distinct wavelength, the transmitting main waveguides of each of the plurality of transmitting architectures being in optical communication with one or more common communicating waveguides, for Wavelength Division Multiplexing (WDM) of the digital, serial-optic words, produced by the plurality of the transmitting architectures;

said one or more common communicating waveguides include a plurality of communicating waveguides for coupling to each of the transmitting main waveguides via a routing optical switch configured for receiving from the transmitting source of the transmitting architecture associated therewith a "waveguide select" signal and routing the digital, serial-optic word to a specific one of the communicating waveguides.

2. The plurality of transmitting architectures of claim 1, wherein at least one of the transmitting architectures is configured such that each of the N parallel secondary laser pulses has a time profile which is substantially identical to the time profile of the primary laser pulse.

3. The plurality of transmitting architectures of claim 1, wherein at least one of the transmitting architectures further includes a header configuration for producing a header signal.

4. The plurality of transmitting architectures of claim 3, wherein said at least one of the transmitting architectures includes at least one of the following: a time-delay configuration for introducing a header time delay between the digital serial-optic word and the header signal; and a portion of the header signal for specifying a receiver address and a portion for producing an electronic triggering signal for electrically activated couplers at a receiving end.

5. The plurality of transmitting architectures of claim 3, wherein the header signal includes a portion for specifying a receiver address and a portion for producing an electronic triggering signal for electrically activated couplers at a receiving end.

6. The plurality of transmitting architectures of claim 3, wherein a beam splitter divides the primary laser pulse to two pulses: a pulse of between about 2% and about 5% of the energy of the primary laser pulse, as the header signal, and a pulse of between about 95% and about 98% of the energy of the primary laser pulse, for forming the digital, serial-optic word.

7. The plurality of transmitting architectures of claim 3, wherein the laser pulse divider divides the primary laser pulse to N+m parallel secondary laser pulses, for forming the digital serial-optic word of N bits and the header signal, having m photonic pulses.

8. The plurality of transmitting architectures of claim 7, wherein the header signal of m photonic pulses is modulated.

9. The plurality of transmitting architectures of claim 1, wherein the fast optical shutters are constructed as electrooptic modulators or electroabsorption modulators.

10. The plurality of transmitting architectures of claim 1, wherein the most significant bit of the digital, parallel-electronic word is configured as one of the following: the lead photonic bit of the digital, serial-optic word; and the trailing photonic bit of the digital, serial-optic word.

11. The plurality of transmitting architectures of claim 1, wherein the transmitting source of the digital, parallel-electronic word is a digital electronic processing unit (EPU).

12. The plurality of transmitting architectures of claim 11, wherein the EPU is a digital electronic network node, selected from an integrated circuit a printed circuit board (PCB), a rack, and a cabinet.

13. The plurality of transmitting architectures of claim 1, configured for communication with a receiver, which is the input unit of a digital electronic network node, selected from a chip, a printed circuit board (PCB), a rack, and a cabinet, the communication being selected from intra-board, inter-board, intra-rack, inter-rack, intra-cabinet, and inter-cabinet.

14. The plurality of transmitting architectures of claim 1, configured and operable to provide at least one of the following: substantially simultaneous activation of the N fast optical shutters; substantially simultaneous coupling of the N parallel photonic bits to the transmitting main waveguide; and substantially equal transmitting optical path lengths between adjacent transmitting coupling points along the transmitting main waveguide.

15. The plurality of transmitting architectures of claim 1, wherein the laser pulse divider is a multi-mode interferometer.

16. The plurality of transmitting architectures of claim 1, wherein the laser for providing the laser beam of the distinct wavelength upon request, includes a laser power grid or a tunable laser.

17. The plurality of transmitting architectures of claim 1, wherein the routing optical switch of each of the plurality of the transmitting architectures is an array 1×L of digital optical switches (DOS).

18. The plurality of transmitting architectures of claim 1, wherein the transmitting main waveguide is a waveguide, selected from the group consisting of a KLTN based alpha waveguide, a silicon based photonic waveguide, and an InP/GaAs based waveguide.

19. A receiving architecture for converting a digital, serial-optic word, represented as a serial string of N photonic bits, to a digital, parallel-electronic word, represented by N parallel electronic bits, the receiving architecture comprising:
a vector of N electrically activated couplers for aligning with a vector of N optoelectronic receivers to form a one-to-one correspondence between the optoelectronic receivers and the electrically activated couplers, the vector of N electrically activated couplers being formed as N 1×2 optical switches, positioned at predetermined receiving coupling points along a receiving main waveguide, spaced apart at receiving optical path lengths which correspond to time delays between the photonic bits of the serial string of N photonic bits, the vector of N electrically activated couplers defining a distal electrically activated coupler, with respect to a receiving-main-waveguide input, and each of the electrically activated coupler comprising:
an input along the receiving main waveguide;
a first output continuing along the receiving main waveguide; and
a second output for directing a light pulse from the receiving main waveguide to a corresponding one of the optoelectronic receivers,
the vector of N electrically activated couplers being thus synchronized and configured for allowing the serial string of N photonic bits to pass along the receiving main waveguide, until the lead photonic bit reaches the distal electrically activated coupler, then activating the N electrically activated couplers and directing all the photonic bits to the optoelectronic receivers, thus converting the serial string of N photonic bits to N parallel photonic bits, and allowing for converting the N parallel photonic bits to N parallel electronic bits by the vector of N optoelectronic receivers, to form the digital, parallel-electronic word.

20. The receiving architecture of claim 19, wherein the electrically activated couplers are activated substantially simultaneously.

21. The receiving architecture of claim 19, wherein the digital, parallel-electronic word is directed to a receiver.

22. The receiving architecture of claim 21, wherein the receiving optical path lengths between adjacent receiving coupling points along the receiving main waveguide are substantially equal.

23. The receiving architecture of claim 22, wherein the receiving optical path lengths are further equal to transmitting optical path lengths between adjacent transmitting coupling points along a transmitting main waveguide of a transmitting architecture.

24. The receiving architecture of claim 21, wherein the receiver is a digital electronic network node, selected from the group consisting of a chip, a printed circuit board (PCB), a rack, and a cabinet.

25. The receiving architecture of claim 24, configured for communication with a transmitting source, which is an input unit of a digital electronic network node, selected from a chip, a printed circuit board (PCB), a rack, and a cabinet, the communication being selected from intra-board, inter-board, intra-rack, inter-rack, intra-cabinet, and inter-cabinet.

26. The receiving architecture of claim 21, wherein the receiving main waveguide is in optical communication with at least one communicating waveguide, which employs wavelength division multiplexing (WDM), to carrying a plurality of wavelengths.

27. The receiving architecture of claim 26, and further including wavelength addressing, wherein a drop WDM filter drops a digital, serial-optic word of a predetermined wavelength of the wavelength address associated with the receiver, into the receiving main waveguide.

28. The receiving architecture of claim 21, wherein the receiving main waveguide is in optical communication with a plurality of communicating waveguides, which employ wavelength division multiplexing (WDM), to carrying a plurality of wavelengths in each of the communicating waveguides.

29. The receiving architecture of claim 28, and further including wavelength addressing, wherein a drop WDM filter drops a digital, serial-optic word of a predetermined wavelength of the wavelength address associated with the receiver, into the receiving main waveguide.

30. The receiving architecture of claim 19, wherein the lead photonic bit in digital, serial-optic word is the most significant bit of the digital, parallel-electronic word.

31. The receiving architecture of claim 19, wherein a header signal is received in advance of the serial string of photonic bits, by a dedicated optoelectronic receiver, which converts the header signal to an electronic triggering signal that activates the vector of N electrically activated couplers.

32. The receiving architecture of claim 31, wherein the header signal includes a header time delay, between the header signal and the digital, serial-optic word, the header time delay being greater than the serial-optic-word time delay.

33. The receiving architecture of claim 19, wherein the receiving main waveguide is a waveguide, selected from a KLTN based alpha waveguide, a silicon based photonic waveguide, and an InP/GaAs based waveguide.

34. A communication architecture, comprising:
   a transmitting architecture, for converting a digital, parallel-electronic word, represented by N parallel electronic bits, to a digital, serial-optic word, represented as a serial string of N photonic bits, the transmitting architecture comprising:
      a transmitting source for the digital, parallel-electronic word of the N parallel electronic bits, each bit being characterized as either an "0" bit or an "1" bit, the source further providing a trigger, synchronized with the digital, parallel-electronic word;
      a laser pulse source, for providing a primary laser pulse, upon receiving the trigger;
      a laser pulse divider, for receiving and dividing the primary laser pulse to N parallel secondary laser pulses, each of 1/N of the energy of the primary laser pulse;
      a vector of N fast optical shutters, each in optical communication with one of the N parallel secondary laser pulses and in signal communication with one of the bits, for allowing passage of the secondary laser pulses for any "1" bit and preventing passage for any "0" bit of the digital, parallel-electronic word, thus producing a digital, parallel-optic word, represented as N parallel photonic bits; and
      a vector of N directional couplers, positioned at predetermined transmitting coupling points along a transmitting main waveguide and aligned with the vector of N fast optical shutters, so as to form a one-to-one correspondence between the fast optical shutters and the directional couplers, wherein transmitting optical path lengths between the transmitting coupling points along the transmitting main waveguide produce delays between the individual pulses of the N parallel photonic bits, thus producing the serial string of the N photonic bits, representing the digital, serial-optic word,
   a receiving architecture for converting a digital, serial-optic word, represented as a serial string of N photonic bits, to a digital, parallel-electronic word, represented by N parallel electronic bits, the receiving architecture comprising:
      a vector of N optoelectronic receivers; and
      a vector of N electrically activated couplers, formed as N 1×2 optical switches, positioned at predetermined receiving coupling points along a receiving main waveguide, spaced apart at receiving optical path lengths which correspond to time delays between the photonic bits of the serial string of N photonic bits, and aligned with the vector of N optoelectronic receivers, so as to form a one-to-one correspondence between the optoelectronic receivers and the electrically activated couplers, the vector of N electrically activated couplers defining a distal electrically activated coupler, with respect to a receiving-main-waveguide input, and each of the electrically activated coupler comprising:
         an input along the receiving main waveguide;
         a first output continuing along the receiving main waveguide; and
         a second output for directing a light pulse from the receiving main waveguide to a corresponding one of the optoelectronic receivers,
      the vector of N electrically activated couplers being thus synchronized and configured for allowing the serial string of N photonic bits to pass along the receiving main waveguide, until the lead photonic bit reaches the distal electrically activated coupler, then activating the N electrically activated couplers and directing all the photonic bits to the optoelectronic receivers, thus converting the serial string of N photonic bits to N parallel photonic bits,
      and further wherein the N parallel photonic bits are converted to N parallel electronic bits by the vector of N optoelectronic receivers, to form the digital, parallel-electronic word, which is directed to a receiver.

35. A method for converting a digital, serial-optic word, represented as a serial string of N photonic bits, to a digital, parallel-electronic word, represented by N parallel electronic bits, the method comprising:
   positioning a vector of N electrically activated couplers, formed as N 1×2 optical switches, at predetermined receiving coupling points along a receiving main waveguide, spaced apart at receiving optical path lengths which correspond to time delays between the photonic bits of the serial string of N photonic bits, and defining a distal electrically-activated coupler, with respect to a receiving-main-waveguide input;
   aligning a vector of N optoelectronic receivers with the vector of N electrically activated couplers, so as to form a one-to-one correspondence between the optoelectronic receivers and the electrically-activated couplers;
   allowing the serial string of N photonic bits to pass along the receiving main waveguide, until the lead photonic bit reaches the distal electrically-activated coupler, so that the other pulses are each at an input channel of a respective one of the N electrically-activated couplers; and
   activating the N electrically-activated couplers, thus converting the serial string of N photonic bits to N parallel photonic bits; and
      at the optoelectronic receivers, converting the N parallel photonic bits to N parallel electronic bits, to form the digital, parallel-electronic word.

* * * * *